United States Patent [19]

Taniquchi

[11] Patent Number: 5,222,037

[45] Date of Patent: Jun. 22, 1993

[54] FLOATING-POINT PROCESSOR FOR PERFORMING AN ARITHMETIC OPERATION ON FIXED-POINT PART DATA WITH HIGH SPEED ROUNDING OF A RESULT

[75] Inventor: Takashi Taniquchi, Osaka, Japan

[73] Assignee: Matsushita Electric Industrial Co., Ltd., Osaka, Japan

[21] Appl. No.: 747,583

[22] Filed: Aug. 20, 1991

[30] Foreign Application Priority Data

Aug. 20, 1990 [JP] Japan .................................. 2-219251

[51] Int. Cl.$^5$ ............................ G06F 7/50; G06F 7/52
[52] U.S. Cl. ...................................... 364/748; 364/745
[58] Field of Search ................................ 364/748, 745

[56] References Cited

U.S. PATENT DOCUMENTS

| | | | |
|---|---|---|---|
| Re. 33,629 | 7/1991 | Palmer et al. ........................ | 364/748 |
| 4,562,553 | 12/1985 | Mattedi et al. ....................... | 364/745 |
| 4,839,846 | 6/1989 | Hirose et al. ......................... | 364/748 |
| 5,027,308 | 6/1991 | Sit et al. .............................. | 364/748 |
| 5,038,313 | 8/1991 | Kojima .................................. | 364/745 |

*Primary Examiner*—David H. Malzahn
*Attorney, Agent, or Firm*—Lowe, Price, LeBlanc & Becker

[57] ABSTRACT

A floating-point processor includes a carry saving adder-subtracter for generating carry data and sum data by performing addition and subtraction of a first fixed-point part having a greater exponent part and a second fixed-point part, which is aligned with the first fixed-point part by being shifted right, having a smaller exponent part according to preferably predetermined conditions. The processor also includes a rounding-carry generating circuit for generating, from a rounding-mode signal and low-order digits of the fixed-point parts, a first rounding-carry, of which the value in case of rounding the result of addition or subtraction between the fixed-point parts to a higher order digit is in agreement with that in case of rounding the result of addition or subtraction therebetween to a lower order digit, and for generating a second rounding-carry in each of the cases of rounding the result of addition or subtraction therebetween. The processor further includes an adder-subtracter for outputting a first result of addition or subtraction between data obtained by adding the first rounding-carry to the least significant digit of the carry data and the sum data and for outputting a second result of adding 1 to or subtracting 1 from the first result and an invention circuit for outputting a logical inversion of all digits of the second result and a selection circuit for selecting one of the first and second results and an output of the inversion circuit.

11 Claims, 8 Drawing Sheets

FIG. 2

| g | r | s | RTP | | | | | | RTM, RTZ | | | | | | RTN | | | | | | | |
|---|---|---|---|---|---|---|---|---|---|---|---|---|---|---|---|---|---|---|---|---|---|---|
| | | | $C_H$ | $C_L$ | $S_s$ | $C_{r1}$ | $C_{r2H}$ | $C_{r2L}$ | $C_H$ | $C_L$ | $S_s$ | $C_{r1}$ | $C_{r2H}$ | $C_{r2L}$ | $C_H^e$ | $C_H^o$ | $C_L$ | $S_s$ | $C_{r1}$ | $C_{r2H}^e$ | $C_{r2L}^o$ | $C_{r2L}$ |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 1 | 1 | 0 | 1 | 0 | 1 | 0 | 0 | 0 | 0 | 0 | 0 | 0 | 0 | 0 | 0 | 0 | 0 | 0 | 0 | 0 |
| 0 | 1 | 0 | 1 | 0 | 1 | 0 | 1 | 0 | 0 | 0 | 0 | 0 | 0 | 0 | 0 | 0 | 0 | 0 | 0 | 0 | 0 | 0 |
| 0 | 1 | 1 | 1 | 0 | 1 | 0 | 1 | 0 | 0 | 0 | 0 | 0 | 0 | 0 | 0 | 0 | 0 | 1 | 0 | 0 | 0 | 0 |
| 1 | 0 | 0 | 1 | 0 | 1 | 0 | 1 | 0 | 0 | 0 | 1 | 0 | 0 | 0 | 0 | 1 | 0 | 1 | 0 | 0 | 1 | 0 |
| 1 | 0 | 1 | 1 | 1 | 0 | 0 | 1 | 1 | 0 | 0 | 1 | 0 | 0 | 0 | 1 | 1 | 0 | 1 | 0 | 1 | 1 | 0 |
| 1 | 1 | 0 | 1 | 1 | 0 | 0 | 1 | 1 | 0 | 0 | 1 | 0 | 0 | 0 | 1 | 1 | 1 | 0 | 0 | 1 | 1 | 1 |
| 1 | 1 | 1 | 1 | 1 | 0 | 0 | 1 | 1 | 0 | 0 | 1 | 0 | 0 | 0 | 1 | 1 | 1 | 0 | 0 | 1 | 1 | 1 |
| 2 | 0 | 0 | 1 | 1 | 0 | 1 | 0 | 0 | 1 | 1 | 0 | 1 | 0 | 0 | 1 | 1 | 1 | 0 | 1 | 0 | 0 | 0 |
| 2 | 0 | 1 | 2 | 1 | 1 | 1 | 1 | 0 | 1 | 1 | 0 | 1 | 0 | 0 | 1 | 1 | 1 | 0 | 1 | 0 | 0 | 0 |
| 2 | 1 | 0 | 2 | 1 | 1 | 1 | 1 | 0 | 1 | 1 | 0 | 1 | 0 | 0 | 1 | 1 | 1 | 0 | 1 | 0 | 0 | 0 |
| 2 | 1 | 1 | 2 | 1 | 1 | 1 | 1 | 0 | 1 | 1 | 0 | 1 | 0 | 0 | 1 | 1 | 1 | 1 | 1 | 0 | 0 | 0 |

| g | r | s | RTP | | | | | | RTM, RTZ | | | | | | RTN | | | | | | | |
|---|---|---|---|---|---|---|---|---|---|---|---|---|---|---|---|---|---|---|---|---|---|---|
| | | | $C_H$ | $C_L$ | $S_s$ | $C_{r1}$ | $C_{r2H}$ | $C_{r2L}$ | $C_H$ | $C_L$ | $S_s$ | $C_{r1}$ | $C_{r2H}$ | $C_{r2L}$ | $C_H^e$ | $C_H^o$ | $C_L$ | $S_s$ | $C_{r1}$ | $C_{r2H}^e$ | $C_{r2L}^o$ | $C_{r2L}$ |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | T | 0 | 0 | 0 | 0 | 0 | 0 | T | T | 1 | 0 | T | T | 0 | 0 | 0 | 0 | 0 | 0 | 0 | 0 |
| 0 | T | 0 | 0 | 0 | 0 | 0 | 0 | 0 | T | T | 1 | 0 | T | T | 0 | 0 | 0 | 0 | 0 | 0 | 0 | 0 |
| 0 | T | T | 0 | 0 | 0 | 0 | 0 | 0 | T | T | 1 | 0 | T | T | 0 | 0 | 0 | 1 | 0 | 0 | 0 | T |
| T | 0 | 0 | 0 | T | 1 | 0 | 0 | T | T | T | 1 | 0 | T | T | 0 | T | T | 1 | 0 | 0 | T | T |
| T | 0 | T | 0 | T | 1 | 0 | 0 | T | T | T | 0 | 0 | T | T | T | T | T | 1 | 0 | T | T | T |
| T | T | 0 | 0 | T | 1 | 0 | 0 | T | T | T | 0 | 0 | T | T | T | T | T | 0 | 0 | T | T | T |
| T | T | T | 0 | T | 1 | 0 | 0 | T | T | T | 0 | 0 | T | T | T | T | T | 0 | 0 | T | T | T |

FIG. 5

| g | r | s | RTP |||||| RTM, RTZ |||||| RTN ||||||||
|---|---|---|---|---|---|---|---|---|---|---|---|---|---|---|---|---|---|---|---|---|---|---|
| | | | $C_H$ | $C_L$ | $S_g$ | $C_{r1}$ | $C_{r2H}$ | $C_{r2L}$ | $C_H$ | $C_L$ | $S_g$ | $C_{r1}$ | $C_{r2H}$ | $C_{r2L}$ | $C_H^e$ | $C_H^o$ | $C_L$ | $S_g$ | $C_{r1}$ | $C_{r2H}^e$ | $C_{r2L}^o$ | $C_{r2L}$ |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 1 | 1 | 0 | 1 | 0 | 1 | 0 | 0 | 0 | 0 | 0 | 0 | 0 | 0 | 0 | 0 | 0 | 0 | 0 | 0 | 0 |
| 0 | 0 | 2 | 1 | 0 | 1 | 0 | 1 | 0 | 0 | 0 | 0 | 0 | 0 | 0 | 0 | 0 | 0 | 0 | 0 | 0 | 0 | 0 |
| 0 | 0 | 3 | 1 | 0 | 1 | 0 | 1 | 0 | 0 | 0 | 0 | 0 | 0 | 0 | 0 | 0 | 0 | 1 | 0 | 0 | 0 | 0 |
| 0 | 1 | 0 | 1 | 0 | 1 | 0 | 1 | 0 | 0 | 0 | 0 | 0 | 0 | 0 | 0 | 0 | 0 | 0 | 0 | 0 | 0 | 0 |
| 0 | 1 | 1 | 1 | 0 | 1 | 0 | 1 | 0 | 0 | 0 | 0 | 0 | 0 | 0 | 0 | 0 | 0 | 1 | 0 | 0 | 0 | 0 |
| 0 | 1 | 2 | 1 | 0 | 1 | 0 | 1 | 0 | 0 | 0 | 1 | 0 | 0 | 0 | 0 | 1 | 0 | 1 | 0 | 0 | 1 | 0 |
| 0 | 1 | 3 | 1 | 1 | 0 | 0 | 1 | 1 | 0 | 0 | 1 | 0 | 0 | 0 | 1 | 1 | 0 | 1 | 0 | 1 | 1 | 0 |
| 0 | 2 | 0 | 1 | 0 | 1 | 0 | 1 | 0 | 0 | 0 | 1 | 0 | 0 | 0 | 0 | 1 | 0 | 1 | 0 | 0 | 1 | 0 |
| 0 | 2 | 1 | 1 | 1 | 0 | 0 | 1 | 1 | 0 | 0 | 1 | 0 | 0 | 0 | 1 | 1 | 0 | 1 | 0 | 1 | 1 | 0 |
| 0 | 2 | 2 | 1 | 1 | 0 | 0 | 1 | 1 | 0 | 0 | 1 | 0 | 0 | 0 | 1 | 1 | 1 | 0 | 0 | 1 | 1 | 1 |
| 0 | 2 | 3 | 1 | 1 | 0 | 0 | 1 | 1 | 0 | 0 | 1 | 0 | 0 | 0 | 1 | 1 | 1 | 0 | 0 | 1 | 1 | 1 |
| 1 | 0 | 0 | 1 | 0 | 1 | 0 | 1 | 0 | 0 | 0 | 1 | 0 | 0 | 0 | 0 | 1 | 0 | 1 | 0 | 0 | 1 | 0 |
| 1 | 0 | 1 | 1 | 1 | 0 | 0 | 1 | 1 | 0 | 0 | 1 | 0 | 0 | 0 | 1 | 1 | 0 | 1 | 0 | 1 | 1 | 0 |
| 1 | 0 | 2 | 1 | 1 | 0 | 0 | 1 | 1 | 0 | 0 | 1 | 0 | 0 | 0 | 1 | 1 | 1 | 0 | 0 | 1 | 1 | 1 |
| 1 | 0 | 3 | 1 | 1 | 0 | 0 | 1 | 1 | 0 | 0 | 1 | 0 | 0 | 0 | 1 | 1 | 1 | 0 | 0 | 1 | 1 | 1 |
| 1 | 1 | 0 | 1 | 1 | 0 | 1 | 0 | 0 | 0 | 0 | 1 | 0 | 0 | 0 | 1 | 1 | 1 | 0 | 0 | 1 | 1 | 1 |
| 1 | 1 | 1 | 1 | 1 | 0 | 1 | 0 | 0 | 0 | 0 | 1 | 0 | 0 | 0 | 1 | 1 | 1 | 0 | 0 | 1 | 1 | 1 |
| 1 | 1 | 2 | 1 | 1 | 0 | 1 | 0 | 0 | 1 | 1 | 0 | 0 | 1 | 1 | 1 | 1 | 1 | 0 | 0 | 1 | 1 | 1 |
| 1 | 1 | 3 | 2 | 1 | 1 | 1 | 1 | 0 | 1 | 1 | 0 | 0 | 1 | 1 | 1 | 1 | 1 | 0 | 0 | 1 | 1 | 1 |
| 1 | 2 | 0 | 1 | 1 | 0 | 1 | 0 | 0 | 1 | 1 | 0 | 0 | 1 | 1 | 1 | 1 | 1 | 0 | 0 | 1 | 1 | 1 |
| 1 | 2 | 1 | 2 | 1 | 1 | 1 | 1 | 0 | 1 | 1 | 0 | 0 | 1 | 1 | 1 | 1 | 1 | 0 | 0 | 1 | 1 | 1 |
| 1 | 2 | 2 | 2 | 1 | 1 | 1 | 1 | 0 | 1 | 1 | 0 | 0 | 1 | 1 | 1 | 1 | 1 | 0 | 0 | 1 | 1 | 1 |
| 1 | 2 | 3 | 2 | 1 | 1 | 1 | 1 | 0 | 1 | 1 | 0 | 0 | 1 | 1 | 1 | 1 | 1 | 1 | 0 | 1 | 1 | 1 |
| 2 | 0 | 0 | 1 | 1 | 0 | 1 | 0 | 0 | 1 | 1 | 0 | 1 | 0 | 0 | 1 | 1 | 1 | 0 | 1 | 0 | 0 | 0 |
| 2 | 0 | 1 | 2 | 1 | 1 | 1 | 1 | 0 | 1 | 1 | 0 | 1 | 0 | 0 | 1 | 1 | 1 | 0 | 1 | 0 | 0 | 0 |
| 2 | 0 | 2 | 2 | 1 | 1 | 1 | 1 | 0 | 1 | 1 | 0 | 1 | 0 | 0 | 1 | 1 | 1 | 0 | 1 | 0 | 0 | 0 |
| 2 | 0 | 3 | 2 | 1 | 1 | 1 | 1 | 0 | 1 | 1 | 0 | 1 | 0 | 0 | 1 | 1 | 1 | 1 | 1 | 0 | 0 | 0 |
| 2 | 1 | 0 | 2 | 1 | 1 | 1 | 1 | 0 | 1 | 1 | 0 | 1 | 0 | 0 | 1 | 1 | 1 | 0 | 1 | 0 | 0 | 0 |
| 2 | 1 | 1 | 2 | 1 | 1 | 1 | 1 | 0 | 1 | 1 | 0 | 1 | 0 | 0 | 1 | 1 | 1 | 1 | 1 | 0 | 0 | 0 |
| 2 | 1 | 2 | 2 | 1 | 1 | 1 | 1 | 0 | 1 | 1 | 1 | 1 | 0 | 0 | 2 | 1 | 1 | 1 | 1 | 1 | 0 | 0 |
| 2 | 1 | 3 | 2 | 2 | 0 | 1 | 1 | 1 | 1 | 1 | 1 | 1 | 0 | 0 | 2 | 2 | 1 | 1 | 1 | 1 | 1 | 0 |
| 2 | 2 | 0 | 2 | 1 | 1 | 1 | 1 | 0 | 1 | 1 | 1 | 1 | 0 | 0 | 2 | 1 | 1 | 1 | 1 | 1 | 0 | 0 |
| 2 | 2 | 1 | 2 | 2 | 0 | 1 | 1 | 1 | 1 | 1 | 1 | 1 | 0 | 0 | 2 | 2 | 1 | 1 | 1 | 1 | 1 | 0 |
| 2 | 2 | 2 | 2 | 2 | 0 | 1 | 1 | 1 | 1 | 1 | 1 | 1 | 0 | 0 | 2 | 2 | 2 | 0 | 1 | 1 | 1 | 1 |
| 2 | 2 | 3 | 2 | 2 | 0 | 1 | 1 | 1 | 1 | 1 | 1 | 1 | 0 | 0 | 2 | 2 | 2 | 0 | 1 | 1 | 1 | 1 |

| g | r | s | RTP C_H | C_L | S_s | C_r1 | C_r2H | C_r2L | RTM, RTZ C_H | C_L | S_s | C_r1 | C_r2H | C_r2L | RTN C_H^e | C_H^o | C_L | S_s | C_r1 | C_r2H | C_r2L^o | C_r2L |
|---|---|---|---|---|---|---|---|---|---|---|---|---|---|---|---|---|---|---|---|---|---|---|
| 1 | 1 | 1 | 1 | 1 | 0 | 1 | 0 | 0 | 0 | 0 | 1 | 1 | T | T | 1 | 1 | 1 | 0 | 1 | 0 | 0 | 0 |
| 1 | 1 | 0 | 1 | 1 | 0 | 1 | 0 | 0 | 0 | 0 | 1 | 1 | T | T | 1 | 1 | 1 | 0 | 1 | 0 | 0 | 0 |
| 1 | 1 | T | 1 | 1 | 0 | 1 | 0 | 0 | 0 | 0 | 1 | 1 | T | T | 1 | 1 | 0 | 1 | 1 | 0 | 0 | T |
| 1 | 0 | 1 | 1 | 1 | 0 | 1 | 0 | 0 | 0 | 0 | 1 | 1 | T | T | 1 | 1 | 0 | 1 | 1 | 0 | 0 | T |
| 1 | 0 | 0 | 1 | 0 | 1 | 1 | 0 | T | 0 | 0 | 1 | 1 | T | T | 0 | 1 | 0 | 1 | 1 | T | 0 | T |
| 1 | 0 | T | 1 | 0 | 1 | 1 | 0 | T | 0 | 0 | 0 | 1 | T | T | 0 | 0 | 0 | 1 | 1 | T | T | T |
| 1 | T | 1 | 1 | 0 | 1 | 1 | 0 | T | 0 | 0 | 0 | 1 | T | T | 0 | 0 | 0 | 1 | 1 | T | T | T |
| 1 | T | 0 | 1 | 0 | 1 | 1 | 0 | T | 0 | 0 | 0 | 1 | T | T | 0 | 0 | 0 | 0 | 1 | T | T | T |
| 1 | T | T | 1 | 0 | 1 | 1 | 0 | T | 0 | 0 | 0 | 1 | T | T | 0 | 0 | 0 | 0 | 1 | T | T | T |
| 0 | 1 | 1 | 1 | 0 | 1 | 1 | 0 | 0 | 0 | 0 | 0 | 0 | 0 | 0 | 0 | 0 | 0 | 1 | 0 | 0 | 0 | 0 |
| 0 | 1 | 0 | 1 | 0 | 1 | 1 | 0 | 0 | 0 | 0 | 0 | 0 | 0 | 0 | 0 | 0 | 0 | 0 | 0 | 0 | 0 | 0 |
| 0 | 1 | T | 1 | 0 | 1 | 1 | 0 | 0 | 0 | 0 | 0 | 0 | 0 | 0 | 0 | 0 | 0 | 0 | 0 | 0 | 0 | 0 |
| 0 | 0 | 1 | 1 | 0 | 1 | 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | T | T | 0 | 0 | 0 | 0 | 0 | 0 | 0 | 0 | 0 | 0 | 0 | 0 | 0 | 0 |
| 0 | 0 | T | 0 | 0 | 0 | 1 | T | T | T | T | 1 | 0 | T | T | 0 | 0 | 0 | 0 | 0 | 0 | 0 | 0 |
| 0 | T | 1 | 0 | 0 | 0 | 1 | T | T | T | T | 1 | 0 | T | T | 0 | 0 | 0 | 0 | 0 | 0 | 0 | 0 |
| 0 | T | 0 | 0 | 0 | 0 | 1 | T | T | T | T | 1 | 0 | T | T | 0 | 0 | 0 | 0 | 0 | 0 | 0 | 0 |
| 0 | T | T | 0 | 0 | 0 | 1 | T | T | T | T | 1 | 0 | T | T | 0 | 0 | T | 1 | 0 | 0 | 0 | T |
| T | 1 | 1 | 0 | 0 | 0 | 0 | 0 | 0 | T | T | 1 | 0 | T | T | 0 | 0 | 0 | 0 | 0 | 0 | 0 | 0 |
| T | 1 | 0 | 0 | 0 | 0 | 0 | 0 | 0 | T | T | 1 | 0 | T | T | 0 | 0 | 0 | 0 | 0 | 0 | 0 | 0 |
| T | 1 | T | 0 | 0 | 0 | 0 | 0 | 0 | T | T | 1 | 0 | T | T | 0 | 0 | T | 1 | 0 | 0 | 0 | T |
| T | 0 | 1 | 0 | 0 | 0 | 0 | 0 | 0 | T | T | 1 | 0 | T | T | 0 | 0 | T | 1 | 0 | 0 | 0 | T |
| T | 0 | 0 | 0 | T | 1 | 0 | 0 | T | T | T | 1 | 0 | T | T | 0 | T | T | 1 | 0 | 0 | T | T |
| T | 0 | T | 0 | T | 1 | 0 | 0 | T | T | T | 0 | 0 | T | T | T | T | T | 1 | 0 | T | T | T |
| T | T | 1 | 0 | T | 1 | 0 | 0 | T | T | T | 0 | 0 | T | T | T | T | T | 1 | 0 | T | T | T |
| T | T | 0 | 0 | T | 1 | 0 | 0 | T | T | T | 0 | 0 | T | T | T | T | T | 0 | 0 | T | T | T |
| T | T | T | 0 | T | 1 | 0 | 0 | T | T | T | 0 | 0 | T | T | T | T | T | 0 | 0 | T | T | T |

FLOATING-POINT PROCESSOR FOR PERFORMING AN ARITHMETIC OPERATION ON FIXED-POINT PART DATA WITH HIGH SPEED ROUNDING OF A RESULT

BACKGROUND OF THE INVENTION

1. Field of the Invention

This invention generally relates to a floating-point processor and more particularly to a floating-point processor which can round a mantissa in a floating-point representation of data representing the result of a floating-point arithmetic operation at a high speed.

2. Description of the Related Art

A conventional circuit for performing addition and subtraction of floating-point data has a configuration as illustrated in, for example, a schematic block diagram of FIG. 8. In this figure, reference characters Xe and Xf designate data (hereunder referred to as exponent part data) representing an exponent part (i.e., a characteristic) of input data X and data (hereunder referred to as fixed-point part data) representing a fixed-point part (i.e., a mantissa) of the input data X, respectively; Ye and Yf exponent part data and fixed-point part data corresponding to input data Y, respectively; 801 an exponent comparing circuit for comparing the exponent part data Xe and Ye of input data X and Y; 802, 803 and 804 selection circuits; 805 a shift circuit; 806 an adder-subtracter circuit; 807 a rounding circuit; 808 a normalization circuit; and Ze and Zf exponent part data and fixed-point part data corresponding to output data Z, respectively.

Hereinafter, an operation of the circuit of FIG. 8 will be described. First, the exponent part data Xe corresponding to the input data X is compared with that Ye corresponding to the input data Y by the comparing circuit 801. Then, the fixed-point part data corresponding to the input data X or Y, the exponent part of which is smaller than that of the other input data, is inputted to the shift circuit 805. Further, the selection circuits 802, 803 and 804 are controlled such that the fixed-point part data corresponding to the input data Y or X, the exponent part of which is greater than that of the other input data, is inputted to the adder-subtracter circuit 806 and the exponent part data corresponding to the input data having the greater exponent part is inputted to the normalization circuit 808. Moreover, at that time, the difference between the exponent parts of the input data X and Y is inputted to the shift circuit 805 as a shift amount. Next, the fixed-point part data inputted to the shift circuit 805 is shifted right by the shift amount (i.e., the difference between the exponent parts of the input data). Thereby, the fixed-point part data corresponding to the input data having the smaller exponent part is aligned with the fixed-point part data corresponding to the input data having the greater exponent part. At that time, among digits which are forced out to the right by the shift and have orders lower than the least significant digit of the resultant data of the shift, the highest order one is employed as a guard digit; the next higher order one as a round digit; and a logical sum of all of the remaining ones as a sticky digit. Thus, information on the guard digit, the round digit and the sticky digit is stored for a rounding operation. Then, in the adder-subtracter circuit 806, the aligned two pieces of the fixed-point part data are added in case where an operation to be performed on the fixed-point part data is an addition. In contrast, a subtraction of the aligned two pieces of the fixed-point parts is performed therein in case where the operation to be performed on the fixed-point part data is a subtraction. Further, the result of the addition or subtraction is outputted to the rounding circuit 807. Incidentally, based on signs of the input data, the relation in magnitude between the two pieces of the exponent part data corresponding to the input data and which of an addition and a subtraction an operation to be performed on the exponent part data is, it is determined which of an addition and a subtraction the operation to be performed on the fixed-point part data is. If the resultant data of the adder-subtracter circuit 806 is negative, data representing a two's complement thereof is generated in the rounding circuit 807 for obtaining the absolute value thereof. Conversely, if positive, the result of the operation on the fixed-point parts is rounded to a predetermined digit and further the result of the rounding is outputted to the normalization circuit 808. The rounding circuit 806 is composed of adders and adds a carry (hereunder sometimes referred to as a rounding carry), which is caused by a rounding, to a predetermined digit of data representing the result of the operation. Next, the fixed-point part of the data inputted to the normalization circuit 808 is shifted right or left therein for the purpose of normalization of the data inputted thereto. If right-shifted, a corresponding shift amount is added to the exponent part data corresponding to the data inputted to the normalization circuit 808. In contrast, if left-shifted, the corresponding shift amount is subtracted from the exponent part data. Then, the operation is performed on the exponent part data. Subsequently, the exponent part data Ze and the fixed-point data Zf corresponding to the result of the addition are outputted. Thus, the operation of the floating-point data is completed.

Next, a conventional circuit for performing a multiplication of floating-point data has a configuration as illustrated in, for example, a schematic block diagram of FIG. 9. In this figure, reference characters Xe and Xf designate exponent part data and fixed-point part data corresponding to the input data X, respectively; Ye and Yf exponent part data and fixed-point part data corresponding to input data Y, respectively; 901 an exponential operation circuit; 902 a fixed-point part multiplier; 903 an adder circuit; 904 a rounding circuit; 905 a normalization circuit; and Ze and Zf exponent part data and fixed-point part data corresponding to output data Z, respectively. Incidentally, reference numeral 900 designates a fixed-point part calculating portion which includes the adder circuit 903 and the rounding circuit 904.

Hereinafter, an operation of the circuit of FIG. 9 will be described. First, the exponent part data Xe and Ye are inputted to the exponential operation circuit 901 whereupon an intermediate exponential operation is performed. Practically, an operation (Xe+Ye−Bi) is performed and the result of this operation is outputted to the normalization circuit 905. Here, Bi represents a bias of an exponent part in a floating-point representation. In case of employing a single precision format of IEEE 754 floating-point standard, Bi=127. Further, in case of employing a double precision format, Bi=1023.

Simultaneously with this operation performed on the exponent part data, the fixed-point part data Xf and Yf are inputted to the fixed-point part multiplier 902 whereupon a plurality of partial products are generated and then the generated partial products are serially added and finally two partial products A and B are generated and outputted. Subsequently, the outputs A and B of the fixed-point part multiplier 902 are added in the adder circuit 903. The result of the addition is outputted from the circuit 903 to the rounding circuit 904. The rounding circuit 904 rounds the result of the operation inputted from the circuit 903 to a predetermined digit and outputs the result of the rounding to the normalization circuit 905. This rounding circuit is composed of adder circuits and adds a rounding carry to a predetermined digit of the result of the operation. Finally, an alignment of the fixed-point part data and a correction of the exponent part data are effected in the normalization circuit 905, and the exponent part data Ze and the fixed-point part data Zf of the result of the multiplication is outputted therefrom. Thus, the multiplication operation is completed.

In case of the above described floating-point adder, the rounding operation is started in the rounding circuit after the operation on the fixed-point part data is completed in the adder-subtracter circuit. If the result of the operation effected in the adder-subtracter circuit is negative, the rounding circuit generates the two's complement of the data representing the result of the operation for obtaining the absolute value thereof. In contrast, if positive, the rounding circuit rounds the result of the operation performed on the fixed-point part data to the predetermined digit. It cannot be determined until the result of the operation effected in the adder-subtracter circuit is obtained whether or not the result of the operation is negative. Further, the generation of the two's complement is effected by performing an logical inversion of each digit of the result of the operation and then adding 1 to the converted result of the operation. Incidentally, when rounding the result of the operation performed on the fixed-point part data, there are two digit positions to which the result of the operation is rounded in case where an addition of the fixed-point part data is effected. This is because there are two cases, namely, a case in which an overflow occurs and another case in which no overflow does not occur when effecting the addition of the fixed-point part data. Further, the number of all digits of the fixed-point part data is determined depending on the format of the data. Therefore, for the alignment of the fixed-point parts, a digit position, to which the result of the operation is rounded in case where an overflow occurs when effecting the addition of the fixed-point part data, should be higher by one digit position than another digit position to which the result of the operation is rounded in case where no overflow occurs. Similarly, when a subtraction is effected between the fixed-point part data, there are two cases, namely, a case where an underflow occurs and another case when no underflow occurs. Thus, there are two digit places, to which a rounding of the operation is rounded, corresponding to the two cases, respectively. However, it cannot be determined until the result of an operation is obtained whether an overflow or underflow occurs correspondingly to the operation. Thus, in case of the above described conventional floating-point adder, it cannot be determined until the result of an operation effected in the adder-subtracter circuit is obtained whether or not the result is negative and whether an overflow or underflow occurs. Therefore, the generation of the two's complement of the result of the operation, as well as the rounding operation, cannot be started until the result of the operation effected in the adder-subtracter circuit is obtained. Consequently, the above described conventional floating-point adder has drawbacks that the addition and subtraction and the rounding operation are time-consuming and that the configuration of the circuit becomes complex.

Further, in case of the above described conventional floating-point multiplier, the rounding operation of the rounding circuit is commenced after the partial products finally obtained by the adder circuit are added. When rounding the fixed-point part data, there are similarly two digit positions to which the fixed-point part data is rounded, in case of effecting the multiplication. This is because there are two cases, namely, a case in which an overflow occurs and another case in which no overflow does not occur when effecting the multiplication of the fixed-point part data. Therefore, similarly as in case of the conventional floating-point adder, it cannot be determined until the partial product are added whether or not an overflow occurs. Thus, in case of the above described conventional floating-point multiplier, the rounding operation cannot be started until the result of the addition of the partial products to be effected by the adder circuit is definitely determined. Consequently, the above described conventional floating-point multiplier has similar drawbacks that the addition of the partial products and the rounding of the result of the operation are time-consuming and that the configuration of the circuit becomes complex. The present invention is accomplished to eliminate the above stated drawbacks of the conventional floating-point processors.

It is, accordingly, an object of the present invention to provide a floating-point processor which includes an additional circuit added to an adder-subtracter circuit, thereby performing an arithmetic operation on fixed-point part data, a calculation of an absolute value of a result of the operation and a rounding of the result of the operation at a high speed with a simple configuration.

Further, it is another object of the present invention to provide a floating-point processor which includes an additional circuit added to an adder for adding two partial products finally obtained therein, thereby performing an arithmetic operation on fixed-point part data and a rounding of the result of the operation at a high speed with a simple configuration.

SUMMARY OF THE INVENTION

To achieve the foregoing object and in accordance with an aspect of the present invention, there is provided a floating-point processor for performing addition and subtraction of two floating-point numbers, which comprises a carry saving adder-subtracter for generating carry data and sum data by performing addition and subtraction of a first fixed-point part of the floating-point number having a greater exponent part and a second fixed-point part, which is aligned with the first fixed-point part by being shifted right, of the other floating-point number having a smaller exponent part according to following equations: (i) in case where an addition is performed, $a_i + b_i = 2c_i + s_i$; (ii) in case where a subtraction is performed and the carry data is positive, $a_i + b_i = 2c_i - s_i$; (iii) in case where a subtraction is performed and the carry data is negative, $a_i - b_i = -2c_i + s_i$; where $a_i$ denotes a value held at an ith digit of the first fixed-point part; $b_i$ a value held at an ith digit of the second fixed-point part; $c_i$ a value held at an ith digit of the carry data; and $s_i$ a value held at an ith digit of the sum data, a rounding-carry generating circuit for generating a first rounding-carry, of which the value in case of rounding a result of addition or subtraction between the first and second fixed-point parts to a higher order digit is in agreement with the value in case of rounding the result of addition or subtraction between the first and second fixed-point parts to a lower order digit, from a rounding-mode signal indicating the direction in which a result of addition or subtraction between the first and second fixed-point parts is rounded, and low-order digits of the first and second fixed-point parts in such a manner not to depend on the value held at a sticky digit and for generating a second rounding-carry in such a manner to depend on the value held at the sticky digit in each of the cases of rounding the result of addition or subtraction between the first and second fixed-point parts to a higher order digit and of rounding the result of addition or subtraction between the first and second fixed-point parts to a lower order digit, an adder-subtracter for outputting a first result of addition or subtraction between data, which is obtained by adding the first rounding-carry to the least significant digit of the carry data, and the sum data and for outputting a second result of adding 1 to or subtracting 1 from the first result, an inversion circuit for outputting a logical inversion of all digits of the second result, and a selection circuit for selecting and outputting one of the first result, the second result and an output of the inversion circuit on the basis of high-order digits of the first and second results and the second rounding-carry.

Further, in accordance with another aspect of the present invention, there is provided a floating-point processor having a fixed-point part multiplier for performing a multiplication of two floating-point numbers, a carry save adder for generating carry data and sum data by performing a carry-saving addition of n highest-digits (n is the number of significant digits of fixed-point parts of the floating point numbers) of two partial products finally obtained by the fixed-point part multiplier according to a following equation: $a_i + b_i = 2c_i + s_i$ where $a_i$ denotes a value held at an ith digit of a first fixed-point part; $b_i$ a value held at an ith digit of a second fixed-point part; $c_i$ a value held at an ith digit of the carry data; and $s_i$ a value held at an ith digit of the sum data, a rounding-carry generating circuit for generating a first rounding-carry, of which the value in case of rounding a result of the multiplication between the first and second fixed-point parts to a higher order digit is in agreement with the value in case of rounding the result of the multiplication between the first and second fixed-point parts to a lower order digit, from a rounding-mode signal indicating the direction in which a result of a multiplication between the first and second fixed-point parts is rounded, and low-order digits of each of the two partial products other than (n−1) highest-order digits thereof in such a manner not to depend on the value held at a sticky digit and for generating a second rounding-carry in such a manner to depend on the value held at the sticky digit in each of the cases of rounding the result of the multiplication between the first and second fixed-point parts to a higher order digit and of rounding the result of the multiplication between the first and second fixed-point parts to a lower order digit, an adder for outputting a first result of an addition between data, which is obtained by adding the first rounding-carry to the least significant digit of the carry data, and the sum data and for outputting a second result of adding 1 to the first result, and a selection circuit for selecting and outputting one of the first and second results on the basis of high-order digits of the first and second results and the second rounding-carry.

Moreover, in accordance with still another aspect of the present invention, there is provided a floating-point processor having a redundant binary fixed-point part multiplier for performing a multiplication of two floating-point numbers, which comprises a carry save subtracter for generating carry data and sum data by performing a subtraction between n-highest-digits (n is the number of significant digits of fixed-point parts floating point numbers) of first and second fixed-point parts of partial product data finally obtained by the redundant binary fixed-point part multiplier according to the following equations: (i) in case where the carry data is positive, $a_i + b_i = 2c_i - s_i$; (ii) in case where the carry data is negative, $a_i - b_i = -2c_i + s_i$; where $a_i$ denotes a value held at an ith digit of the first fixed-point part; $b_i$ a value held at an ith digit of the second fixed-point part; $c_i$ a value held at an ith digit of the carry data; and $s_i$ a value held at an ith digit of the sum data, a rounding-carry generating circuit for generating a first rounding-carry, of which the value in case of rounding a redundant binary result of the multiplication between the first and second fixed-point parts to a higher order digit is in agreement with the value in case of rounding the redundant binary result of the multiplication to a lower order digit, from a rounding-mode signal indicating the direction in which a result of a multiplication between the first and second fixed-point parts is rounded, and low-order digits of the redundant binary result other than (n−1) highest-order digits thereof in such a manner not to depend on the value held at a sticky digit and for generating a second rounding-carry in such a manner to depend on the value held at the sticky digit in each of the cases of rounding the redundant binary result of the multiplication to a higher order digit and of rounding the redundant binary result of the multiplication to a lower order digit, a subtracter for outputting a first result of a subtraction between data, which is obtained by adding the first rounding-carry to the least significant digit of the carry data, and the sum data and for outputting a second result of subtracting 1 from the first result, and a selection circuit for selecting and outputting one of the first and second results on the basis of high-order digits of the first and second results and the second rounding-carry.

Thus, in case of the floating-point processor of the present invention, a first rounding-carry, of which the value is case of rounding the result of an operation performed on the fixed-point parts to a higher order digit is in agreement with the value in case of rounding the result of the operation to a lower order digit, and a second rounding-carry in such a manner to depend on the value held at a sticky digit in each of the cases of rounding the result of the operation to a higher order digit and of rounding the result of the operation to a lower order digit are generated by the rounding-carry generating circuit. Further, a first result obtained by using only the first rounding-carry and a second result obtained by adding 1 to or subtracting 1 from the first result are calculated by using the carry save adder-subtracter and the adder-subtracter. Moreover, the inversion circuit outputs data obtained by changing the sign of the first result in case where the first result becomes negative. It is determined by the high-order digits of the first and second rounding-carries whether or not the result is negative and whether the result of the operation should be rounded to a higher order digit or to a lower order digit. By such determination, correctly rounded result of the operation on the fixed-point parts can be finally obtained.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 2 is a truth table for illustrating a method of generating a rounding carry in case of performing an addition in the first embodiment of the present invention;

FIG. 3 is a truth table for illustrating a method of generating a rounding carry in case of performing a subtraction in the first embodiment of the present invention;

FIG. 5 is a truth table for illustrating a method of generating a rounding carry in the second embodiment of the present invention;

FIG. 7 is a truth table for illustrating a method of generating a rounding carry in the third embodiment of the present invention;

DETAILED DESCRIPTION OF THE PREFERRED EMBODIMENTS

Hereinafter, preferred embodiments of the present invention will be described in detail by referring to the accompanying drawings.

Figure 1:
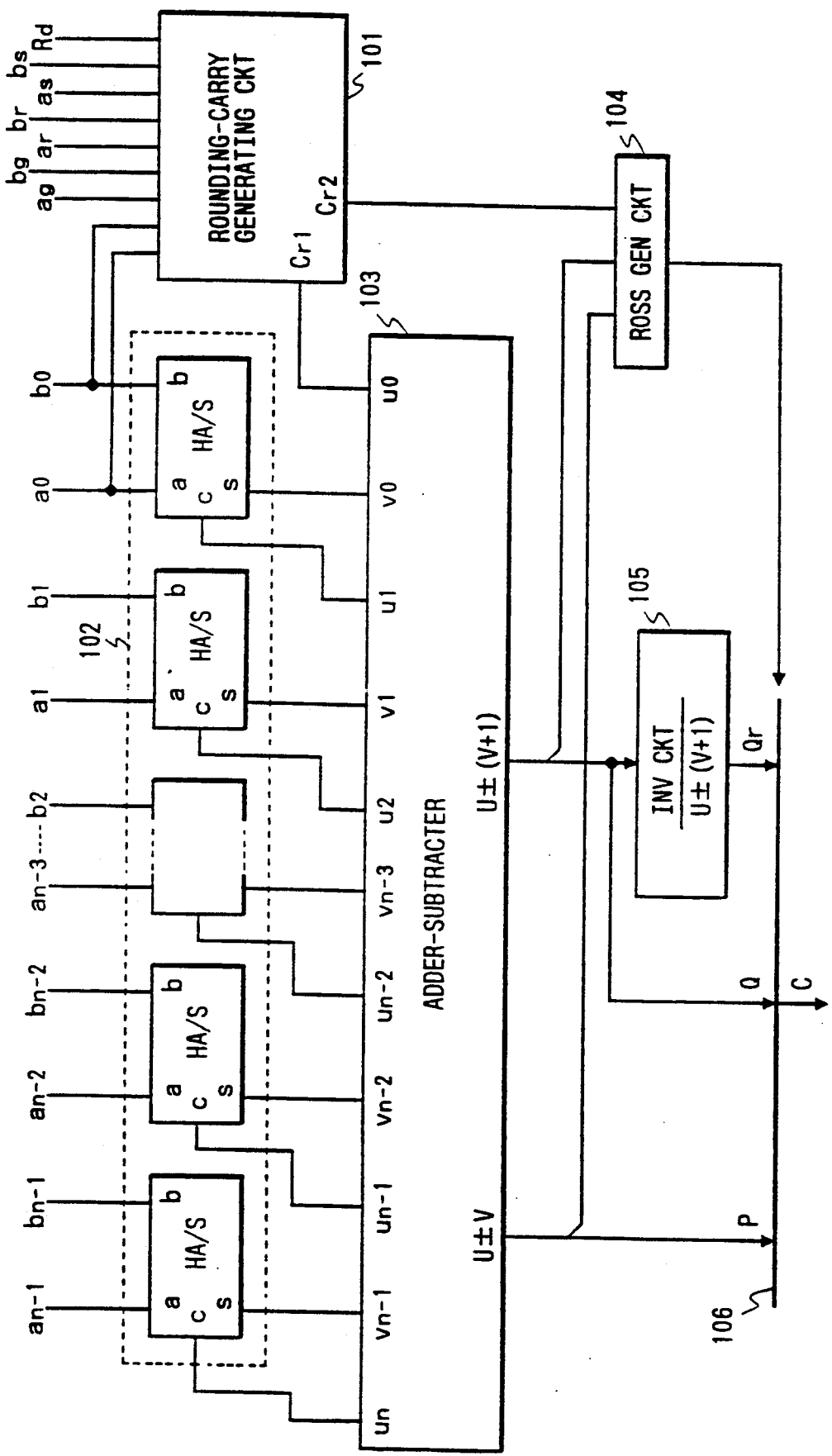
FIG. 1 is a schematic block diagram for illustrating the construction of a circuit for performing an operation on fixed-point parts of input floating-point numbers and rounding the result of the operation, which is provided in a floating-point adder-subtracter, namely, a first embodiment of the present invention.
Figure 8:
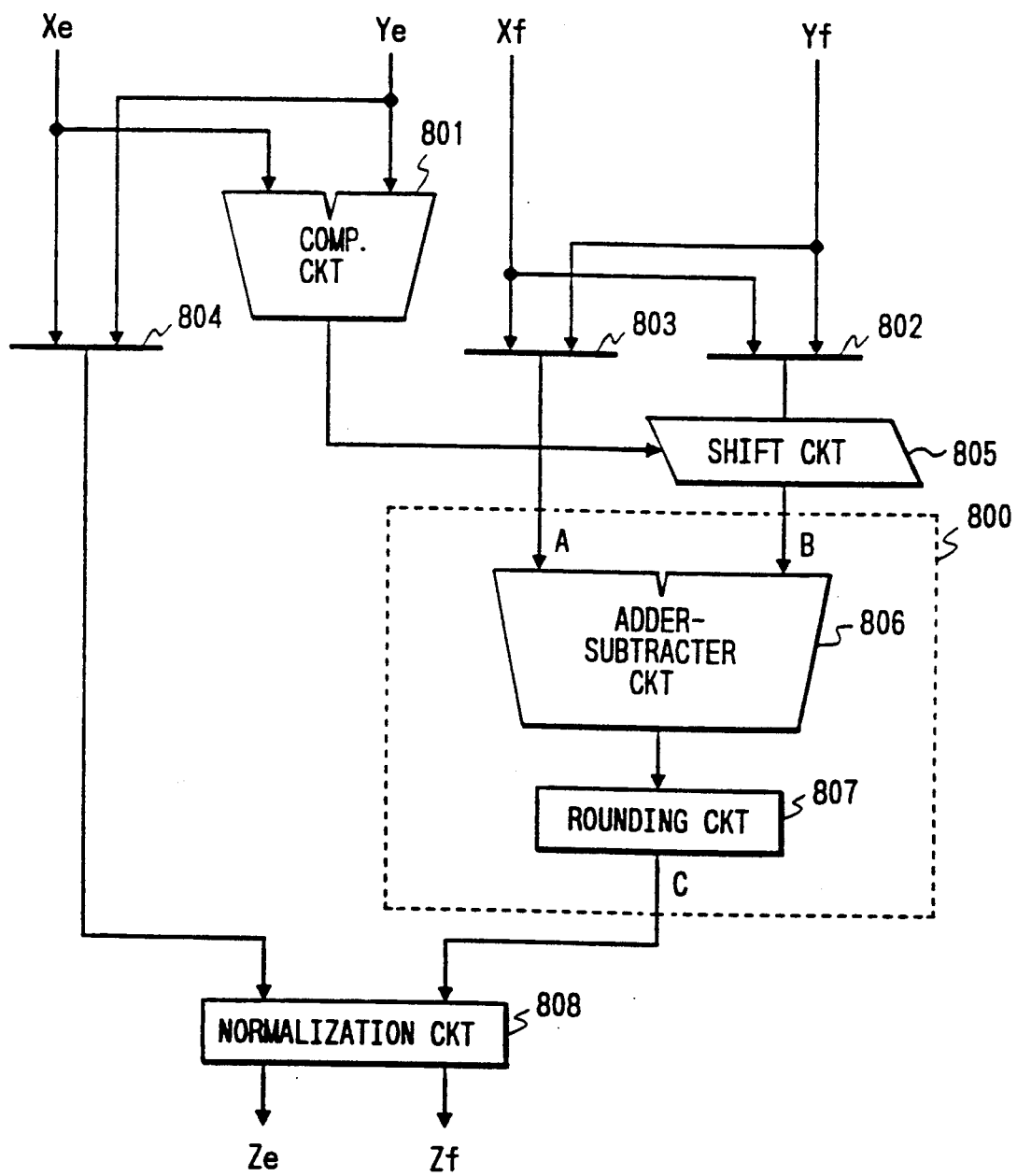
FIG. 8 is a schematic block diagram for illustrating the construction of a conventional floating-point adder.

FIG. 1 is a schematic block diagram for illustrating the construction of a first embodiment of the present invention. This circuit of FIG. 1 performs an addition or a subtraction of fixed-point part data aligned with each other on the basis of the values of exponent part data corresponding to two pieces of input floating-point data and obtains an absolute value of the result of the addition or subtraction and outputs the result of a rounding. Moreover, the circuit of FIG. 1 corresponds to a floating-point operating portion 800 of the conventional floating-point adder of FIG. 8. In FIG. 1, reference numeral 101 denotes a rounding carry generating circuit; 102 a carry save adder-subtracter; 103 an adder-subtracter; 104 a result-of-operation-selecting-signal generating circuit; 105 an inversion circuit; and 106 a selection circuit. Further, reference character Rd designates a rounding mode signal; $a_i$ a value held at each digit of an operand A, namely, a fixed-point part a of floating-point data having a greater exponent part after the fixed-point parts of the input floating-point data are aligned with each other (i=0, 1, ..., n−1, g, r, s), $b_i$ a value held at each digit of another operand A, namely, a fixed-point B of floating-point data having a smaller exponent part after the fixed-point parts of the input floating-point data are aligned with each other (i=0, 1, ..., n=1, g, r, s); $u_i$ a value of each digit of a carry (or a borrow) inputted from the carry save adder-subtracter 102 to the adder-subtracter 103 (i=0, 1, ..., n); and $v_j$ a value of each digit of a sum (or a difference) inputted from the carry save adder-subtracter 102 to the adder-subtracter 103 (j=0, 1, ..., n−1). Further, P designates data indicating (U±V); and Q data indicating {U±(V+1)}. Moreover, $p_i$ indicates an element of the data P (i=0, 1, ..., n); and $q_i$ an element of data Q (i=0, 1, ..., n). Furthermore, Qr represents data obtained by performing a logical inversion of all digits of the data Q, and C represents a result of an operation performed on fixed-point part data. Incidentally, in the following description, a carry and a sum can be replaced by a borrow and a difference, respectively, in case of performing a subtraction.

Hereunder, an operation of the circuit of FIG. 1 will be described briefly. First, two carries $C_{r1}$ and $C_{r2}$ for a rounding operation are obtained from low-order digits of the data A and B and the rounding mode signal Rd for indicating the direction n which the rounding operation is performed, by the rounding carry generating circuit 101. When performing an operation, an overflow or underflow sometimes occurs. Thus, two kinds of values of a carry, namely, a value of a carry in case of rounding data to a higher order digit and another value of a carry in case of rounding data to a lower order digit are obtained. At that time, the adder-subtracter 103 to be used is common to both of the cases of rounding data to a higher order digit and of rounding data to a lower order digit. As the result, the rounding carry generated in both of the cases is added to the same digit of data in the adder-subtracter 103. Further, a sum of the carries $C_{r1}$ and $C_{r2}$ becomes a carry for a rounding into the least significant bit of the data of the adder-subtracter 103. Between these carries, the carry $C_{r1}$ is inputted to the adder-subtracter 103. Simultaneously with this, an addition or subtraction between high-order n digits of the input data A and B is effected and then a carry (or a borrow) c and a sum (or a difference) s are calculated at each digit by the carry save adder-subtracter 102. The obtained carry and sum c and s are inputted to the adder-subtracter 103. Subsequently, an addition or subtraction between the data thus inputted to the adder-subtracter 103 is performed therein to calculate P=U±V and Q=U±(V+1). Then, the calculated data P and Q are inputted to the inversion circuit 105 and the selection circuit 106. The inversion circuit 105 performs a logical inversion of each digit of the data Q obtained by the adder-subtracter 103, and the result of the inversion is inputted to the selection circuit 106. In case where a subtracting is effected in the adder-subtracter 103, the data representing {−(V+1)} is inputted to the inversion circuit 105. Further, the result (V−U) is obtained by effecting a logical inversion of each digit of the data representing {U−(V+1)}. Next, a result-of-operation selecting signal is produced from the carry $C_{r2}$ outputted from the rounding carry generating circuit 101 and the high-order digits of the data P and Q outputted from the adder-subtracter 103 by the result-of-operation-selecting-signal generating circuit 104. The produced result-of-operation selecting signal is inputted to the selection circuit 106. Then, the selection circuit 106 selects one of the data (U±V), {U±(V+1)} and the result of the logical inversion of the data {U±(V+1)} and outputs the selected data as the result C of the operation performed on fixed-point part data.

Hereinafter, an operation of each circuit of FIG. 1 will be explained in detail.

In FIG. 1, reference numeral 101 designates the rounding carry generating circuit which calculates the two carries $C_{r1}$ and $C_{r2}$ for a rounding operation from low-order digits of the data A and B and the rounding mode signal Rd for indicating the direction in which the rounding operation is performed.

First, data to be inputted to this circuit will be described hereinbelow. Namely, data to be inputted to this circuit are fixed-point parts A and B which are aligned with each other by shifting thereof based on the difference between the corresponding exponent parts. There are two digits to which the result of an operation is rounded depending on the result of the operation when effecting the rounding. This is because a digit, to which the result of an addition is rounded in case where an overflow occurs due to a carry, is different from another digit, to which the result of the addition is rounded in case where no overflow occurs due to a carry, by only one digit. Therefore, the order of the digit, to which the result of an addition is rounded in the former case, should be higher than that of the other digit, to which the result of an addition is rounded in the latter case, by one digit. Similarly, when effecting a subtraction, there are two cases, namely, a case in which an underflow occurs due to a carry and another case in which no underflow occurs due to a carry. Thus, the order of the digit, to which the result of a subtraction is rounded in the former case, should be lower than that of the other digit, to which the result of a subtraction is rounded in the latter case, by one digit. Therefore, in each case of performing an addition or subtraction, there are two digits to which the result of the addition or subtraction is rounded. In the following description, it is assumed that the fixed-point parts are aligned such that the digit, to which the result of an addition is rounded, is in agreement with the digit, to which the result of a subtraction is rounded. Namely, the alignment is effected such that the digit $a_o$ or $b_o$ of the fixed part A or B become the least significant bit (LSB) in case of rounding the result of the operation to a higher order digit, and the digit $a_g$ or $b_g$ become LSB in case of rounding data to a lower order digit. In other words, it is suppose that in case where the operation to be performed on the fixed-point part data is an addition, the alignment of the fixed-point part data is performed such that the least significant digit position of the fixed-point part A of the floating-point data having a greater exponent part becomes the guard digit position. Further, it is assumed that in case where the operation to be performed on the fixed-point part data is a subtraction, the alignment of the fixed-point part is performed such that the order of the least significant digit of the fixed-point part A of the floating-point data having a greater exponent part becomes higher than that of the guard digit by one digit. Moreover, it is assumed that on the other hand, the fixed-point part of the floating-point data having a smaller exponent part is aligned with the fixed-point part A of the floating-point data having the greater exponent part by being right-shifted by the number of digits corresponding to the difference between the exponent parts. In this case, among digits which are forced out to the right by the shift and other than highest-order n digits of the fixed-point parts of the floating-point data, the highest order digits are represented as guard digits $a_g$ and $b_g$; the next higher order digits as round digits $a_r$ and $b_r$; and each piece of information on all of the remaining digits is represented as sticky digits $a_s$ and $b_s$. Thus, information on the guard digits, the round digits and the sticky digits is stored for precisely performing a rounding operation. Usually, an operation of generating a sticky digit is time-consuming.

FIG. 2 is a truth table for illustrating how the rounding carries $C_{r1}$ and $C_{r2}$ are generated correspondingly to values of the low-order digits (namely, values of the guard digit, the round digit and the sticky digit) and to rounding modes in case where the operation to be performed on the fixed-point part data is an addition and the result of the addition becomes positive. In this figure, each value of the leftmost column g represents a value (namely, a sum) obtained by adding the values held at the guard digits $a_g$ and $b_g$. As is seen from this figure, there a set of three values {0, 1 and 2} appear in the column g. In case where both of the guard digits $a_g$ and $b_g$ have a value of 0, the sum is 0. Further, in case where only one of the guard digits $a_g$ and $b_g$ have a value of 0, the sum is 1. Moreover, in case where both of the guard digits $a_g$ and $b_g$ have a value of 1, the sum is 2. Similarly as in case of the column g, each value of a column r is obtained from values held at the round digits $a_r$ and $b_r$. However, as described above, in case of an addition, the alignment is effected such that the least significant digit of the fixed-point part A of the floating-point data having a greater exponent part is in agreement with the guard digit. Thus, both of the digits $a_r$ and $a_s$ have a value of 0. Consequently, only values of 0 and 1 appear in the column r.

In addition, information of a column s is used for the rounding of the fixed-point part data to a lower order digit and includes information indicating whether or not all data held at digits, of which the orders are equal to or less than the sticky digit, are 0. Further, the digit $a_s$ has a value of 0 as described above. Therefore, each value of the column s is obtained by ORing, namely, computing a logical sum of data held at digits, the orders of which are equal to or less than that of the sticky digit corresponding to the aligned fixed-part B. Consequently, in the column s corresponding to the sticky digit, only values of 0 and 1 appear. Further, columns RTP, RTM, RTZ and RTN correspond to each rounding mode indicating the direction in which the rounding is effected according to IEEE 754 floating-point standards. Namely, the columns RTP, RTM, RTZ and RTN correspond to a "round toward+infinity" mode, a "round toward−infinity" mode, a "round toward zero" mode and a "round to nearest" mode, respectively. If the fixed-point part is positive, the same result is obtained in cases of the "round toward−infinity" mode and the "round toward zero" mode, Moreover, reference character $C_H$ designates a carry into the next higher digit to the guard digit in case of rounding the result of the operation to a higher order digit; and $C_L$ a carry into the next higher digit to the guard digit in case of rounding the result of the operation to a lower order digit. Furthermore, $C_H^e$ denotes a rounding carry in case where a value held at the next higher digit to the guard digit is even when rounding the result of the operation to a higher order digit in the "round to nearest" mode; and $C_H^o$ a rounding carry in case where a value held at the next higher digit to the guard digit is odd when rounding the result of the operation to a higher order digit in the "round to nearest" mode. Incidentally, according to IEEE 754 floating-point standards, if there are two representable nearest values to data before rounded in the "round to nearest" mode, the data should be rounded in such a manner that LSB of the fixed-point part of the data is 0. Thus, a rounding carry changes depending on which of an even value and an odd value the next higher digit to the guard digit has. Further, in FIG. 2, columns $S_g$ represents results of additions at the guard digit place.

As can be understood from FIG. 2, each of the rounding carries $C_H$ and $C_L$ has a value of 0, 1 or 2. Thus, in order to realize a carry of 0, 1 or 2, the carry is generated by effecting the following two steps. Namely, a one-stage carry-saving addition is first performed. Thereafter, another addition is effected by employing a carry look ahead method or the like. Thus, the carry $C_{r1}$ is added to the result of the carry-saving addition. In addition to this, the result of a carry-look-ahead addition is selected by the carry $C_{r2}$. At that time, the carry $C_{r1}$ generated in case of rounding the result to a higher order digit is made to be in agreement with that generated in case of rounding the result to a lower order digit. Namely, the carries $C_{r1}$ and $C_{r2}$ are obtained such that the following two equations (1) and (2) are satisfied:

$$C_H = C_{r1} + C_{r2H} \qquad (1)$$

$$C_L = C_{r1} + C_{r2L} \qquad (2)$$

where $C_{r2H}$ is a value of the carry $C_{r2}$ in case of rounding the result to a higher order digit, and $C_{r2L}$ is a value of the carry $C_{r2}$ in case of rounding the result to a lower order digit. This results in that the identical carry save adder and carry look ahead adder can be used in common to both of the cases of rounding the result to a higher order digit and of rounding the result to a lower order digit. The carry-saving addition, the carry-look-ahead addition and the time-consuming generation of the sticky digit can be performed in parallel with one another by determining a logic to generate the positive carry $C_{r1}$ in such a manner not to depend on the value of the column s (namely, that of the sticky digit). In case of the example of this truth table, the generation of the carry $C_{r1}$ depends on only the value of the guard digit (namely, the values of the column g). The method of generating the carries $C_{r1}$ and $C_{r2}$ as described above by referring to FIG. 2 is mere an example. The same effects can be obtained by employing another combination of the carries.

Further, FIG. 3 is a truth table for illustrating how the rounding carries $C_{r1}$ and $C_{r2}$ are generated correspondingly to values of the low-order digits (namely, values of the guard digit, the round digit and the sticky digit) and to the rounding modes in case where the operation to be performed on the fixed-point part data is a subtraction and the result of the subtraction becomes positive. In this figure, reference character g represents each value obtained by subtracting a value of the guard digit $b_g$ from a value of the guard digit $a_g$. As described above, in case of a subtraction, the alignment is effected such that the least significant digit of the fixed-point part A of the floating-point data having a greater exponent part is in agreement with a digit, the order of which is higher than that of the guard digit by one digit. Thus, all of the digits $a_g$, $a_r$ and $a_s$ have a value of 0. Consequently, only values of 0 and $-1$ appear in the column g. The column r has only values of 0 and $-1$ similarly to the column g. Further, information of the column s is used for the rounding of the fixed-point part data and includes information indicating whether or not all data held at digits, of which the orders are equal to or less than the sticky digit, are 0. Further, the digit $a_s$ has a value of 0 as described above. Therefore, each value of the column s is obtained by computing a logical sum of data held at digits, the orders of which are equal to or less than that of the sticky digit corresponding to the aligned fixed-part B. Thus, in the column s corresponding to the sticky digit, only values of 0 and $-1$ appear. Further, the columns RTP, RTM, RTZ and RTN and the carries $C_H$, $C_L$, $C_H^e$ and $C_H^o$ and the result $s_g$ are similar to those of FIG. 2.

As can be understood from FIG. 3, each of the rounding carries $C_H$ and $C_L$ has a value of 0 or $-1$. In this case, the carry of 0 or $-1$ can be realized by performing a subtraction having only one stage. However, in order to use the same configuration of the circuit as employed in case of the addition, the carry is generated by effecting the following two steps, similarly as in case of the addition. Namely, a one-stage carry-saving subtraction is first performed. Thereafter, another subtraction is effected by employing a carry look ahead method or the like. Thus, the carry $C_{r1}$ is added to the result of the carry-saving subtraction. Subsequently, the result of a carry-look-ahead subtraction is selected by the carry $C_{r2}$. At that time, the carry $C_{r1}$ generated in case of rounding the result to a higher order digit is made to be in agreement with that generated in case of rounding the result to a lower order digit. Namely, the carries $C_{r1}$ and $C_{r2}$ are obtained such that the equations (1) and (2) are satisfied. This results in that the identical carry save subtracter and carry look ahead subtracter can be used in common to both of the cases of rounding the result to a higher order digit and of rounding the result to a lower order digit. The carry-saving subtraction, the carry-look-ahead subtraction and the time-consuming generation of the sticky digit can be performed in parallel with one another by determining a logic to generate the carry $C_{r1}$ in such a manner not to depend on the value of the column s (namely, that of the sticky digit). In case of the example of this truth table, the carry $C_{r1}$ is always made to be 0. The method of generating the carries $C_{r1}$ and $C_{r2}$ as described above by referring to FIG. 3 is mere an example. The same effects can be obtained by similarly employing another combination of the carries.

As described above, the rounding-carry generating circuit 101 performs the function of calculating the carries $C_{r1}$ and $C_{r2}$ according to kinds of arithmetic operations, the rounding modes and the input data.

Next, the carry save adder-subtracter 102 will be described hereinbelow. This circuit is used to calculate a carry and a sum correspondingly to each digit in order to enable an addition of the carry $C_{r1}$ for a rounding to the least significant digit of each of the two pieces of the input data. Further, this circuit is composed of half adder-subtracters. Namely, each half adder-subtracter operates as a half adder in case where the operation to be performed on the fixed-point part data is an addition, and operates as a half subtracter in case where the operation to be performed on the fixed-point part data is a subtraction. In the former case (namely, in case of performing the addition), each of the carries $C_H$ and $C_L$ have a value of 0, 1 or 2. Therefore, in order to realize a carry having a value of 2, the carry $C_{rl}$ into the least significant digit of each of the two pieces of the input data should have a positive value. Conversely, in case where the operation to be performed on the fixed-point part data is a subtraction, each of the carries $C_H$ and $C_L$ have a value of either 0 or $-1$. Thus, the value of the carry $C_{rl}$ may be positive or negative. Let $a_i$ and $b_i$ denote operands at an ith digit. In case of an addition, the corresponding carry $c_i$ and the corresponding sum $s_i$ are determined from the following equation (3):

$$a_i + b_i = 2c_i + s_i \qquad (3)$$

In contrast, in case where the operation to be performed is a subtraction and the carry $C_{rl}$ is made to be positive, the corresponding carry $c_i$ and the corresponding sum $s_i$ are determined from the following equation (4):

$$a_i - b_i = 2c_i - s_i \qquad (4)$$

Further, in case where the operation to be performed is a subtraction and the carry $C_{rl}$ is made to be negative, the corresponding carry $c_i$ and the corresponding sum $s_i$ are determined from the following equation (5):

$$a_i - b_i = -2c_i + s_i \qquad (5)$$

In this case, a truth table is listed below.

| Input Data | | Addition | | Subtraction ($C_{rl}$ is positive) | | Subtraction ($C_{rl}$ is negative) | |
|---|---|---|---|---|---|---|---|
| $a_i$ | $b_i$ | $c_i$ | $s_i$ | $c_i$ | $s_i$ | $c_i$ | $s_i$ |
| 0 | 0 | 0 | 0 | 0 | 0 | 0 | 0 |
| 0 | 1 | 0 | 1 | 0 | 1 | 1 | 1 |
| 1 | 0 | 0 | 1 | 1 | 1 | 0 | 1 |
| 1 | 1 | 1 | 0 | 0 | 0 | 0 | 0 |

This embodiments corresponding to the case where the carry $C_{rl}$ is positive. The carry save adder-subtracter 102 has the above described half adder-subtracters of the number equal to that of digits of the input data.

Next, the adder-subtracter 103 will be described hereinbelow. This circuit is used to calculate the following equations from carry data U, which is formed by using the carry $C_{rl}$ generated by the rounding-carry generating circuit 101 and the carries $c_i$ obtained by the carry save adder-subtracter 102, and sum data V which is formed by using the sum $S_i$ obtained by the carry save adder-subtracter 102, in case where the operation to be performed on the fixed-point part data is an addition:

$$P = U + V$$

$$Q = U + (V+1).$$

In contrast, this circuit is used to calculate the following equations from the carry data U and the sum data V in case where the operation to be performed on the fixed-point part data is a subtraction:

$$P = U - V$$

$$Q = U - (V+1).$$

These arithmetic operations correspond to the calculation of $(U \pm V)$ in cases where the carry into the least significant digit of the input data is 0 and 1. This adder-subtracter may be formed by a carry look ahead circuit, a carry selection circuit or the like. Further, high-order digits (namely, $p_n$, $p_{n-1}$ and $q_{n-1}$) of the result of the addition or subtraction are preferentially obtained at a high speed.

Next, the result-of-operation-selecting-signal generating circuit 104 will be described hereinbelow. This circuit is used to generate a signal for selecting a suitable result from P and Q obtained by the adder-subtracter 103 and Qr obtained by performing a logical inversion of each digit of Q on the basis of the carry $C_{r2}$ obtained by the rounding-carry generating circuit 101 and the high-order digits (namely, $p_n$, $p_{n-1}$ and $q_{n-1}$) of P and Q.

The selection of the result of the operation is performed by determining whether the result is positive or negative, based on the value of $p_n$ of the result of calculating the expression $P = U - V$. The result of the operation becomes negative when the operation to be performed on the fixed-point part data is a subtraction, the two pieces of the input data have the same exponent part and the minuend is smaller than the subtrahend. In such a case, as the result of the operation on the fixed-point part data, the absolute value thereof should be outputted. Further, in this case, all of the guard digit, the rounding digit and the sticky digit become equal to 0. Therefore, there is no necessity of taking a rounding into consideration. In case where the result of the operation becomes negative, the high-order digit $p_n$ of the result of calculating the equation $P = U - V$ becomes equal to 1 due to an overflow. In this case, Qr obtained by performing the logical inversion of all digits of $Q = U - (V+1)$ is selected and outputted as the result of the operation. This is because $Qr = -(U-V)$. For instance, let A denote a binary number. The two's complement of the number A (namely, the value $(-A)$ obtained by inverting the sign of the number A) is generated by performing the logical inversion of all digits of the number A and then adding 1 to the result of the logical inversion. Namely, $$-A = ^-A + 1 \qquad (6)$$

where $^-A$ denotes the result of the logical inversion of all digits of the number A. Thus, a value $(-P)$ obtained by inverting the sign of P $(=U-V)$ is represented by modifying the equation $P = U - V$ as follows:

$$\begin{aligned} -P &= -(U-V) \\ &= -(U-(V+1)) - 1 \\ &= ^-(U-(V+1)) + 1 - 1 \\ &= ^-(U-(V+1)) \end{aligned} \qquad (7)$$

Therefore, the value $(-P)$ can be obtained by performing the logical inversion of all digits of the term $(U - (V+1))$, namely, Q.

Next, consider a case where the high-order digit $p_n$ of the result of calculating the equation $P = U - V$ is equal to 0. In this case, the result of the operation is judged as positive. In case that the result of the operation is positive, it is first determined whether the result of the operation is rounded to a higher order digit or to a lower order digit. This determination is effected, based on the value $p_{n-1}$ and $q_{n-1}$ held at the highest-order digit of resultant data obtained in case of rounding the result of the operation to a lower order digit. Namely, the determination is effected, based on the value $p_{n-1}$ held at the most significant digit of P ($-U-V$) in case that a carry $C_{r2L}$ for a rounding is 0 when rounding the result of the operation to a lower order digit. Further, the determination is effected, based on the value $q_{n-1}$ held at the most significant digit of Q ($=U-(V+1)$) in case that the carry $C_{r2L}$ for a rounding is 1 when rounding the result of the operation to a lower order digit. The rounding of the result of the operation to a lower order digit means that the result of the rounding is represented with a higher precision. When the most significant digit of the result of the rounding with the higher precision is 1, an overflow occurs and therefore data obtained by rounding the result of the operation to a higher order digit should be chosen. Further, if the most significant digit of the result of the rounding with the higher precision is 0, the rounding has been suitably effected and therefore the data obtained by rounding the result of the operation to a lower order should be chosen. After it is determined whether the result of the operation is rounded to a higher order digit or to a lower order digit, the result of the calculation of the equation $P=U-V$ should be selected in case where the corresponding carry $C_{r2L}$ or $C_{r2H}$ is 0. In contrast, in case where the corresponding carry $C_{r2L}$ or $C_{r2H}$ is 1, the result of the calculation of the equation $Q=U-(V+1)$ should be selected.

After the result of the operation performed on the fixed-point data is obtained in the above described manner, the obtained result is inputted to the normalization circuit whereupon the alignment of the fixed-point part data and the correction of the exponent part data are performed. Thus, the floating-point operation is completed.

By constructing a fixed-part data processing circuit as above described, an addition or subtraction performed on fixed-point part data, a rounding operation and calculation of an absolute value of fixed-point part data in case where the result of the subtraction of the fixed-point part data is negative can be performed at a high speed by using the same processing circuit.

Figure 4:
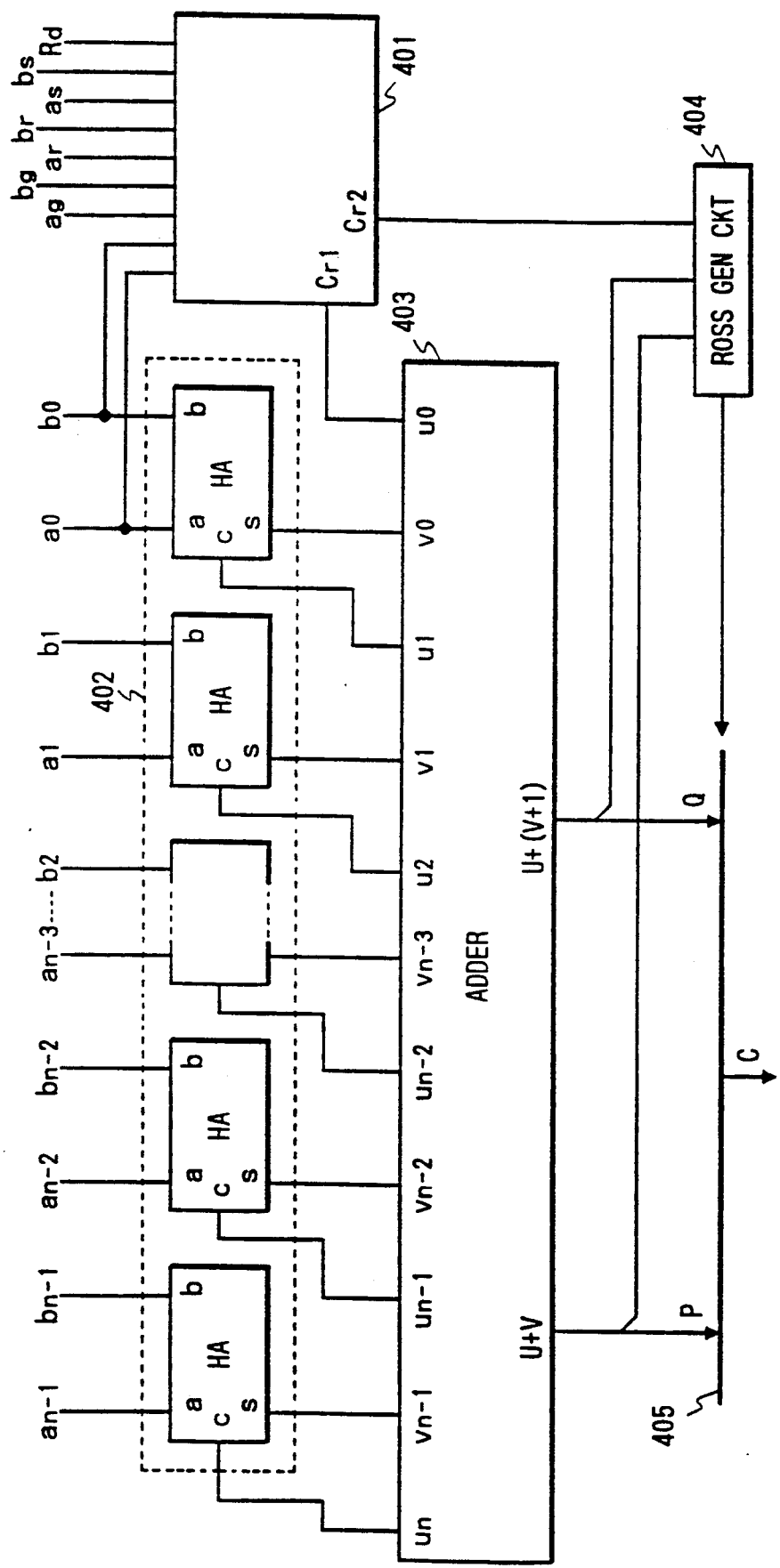
FIG. 4 is a schematic block diagram for illustrating the construction of a circuit for performing an addition of partial products finally obtained from fixed-point parts of input floating-point numbers and rounding the result of the addition, which is provided in a floating-point multiplier, namely, a second embodiment of the present invention.
Figure 9:
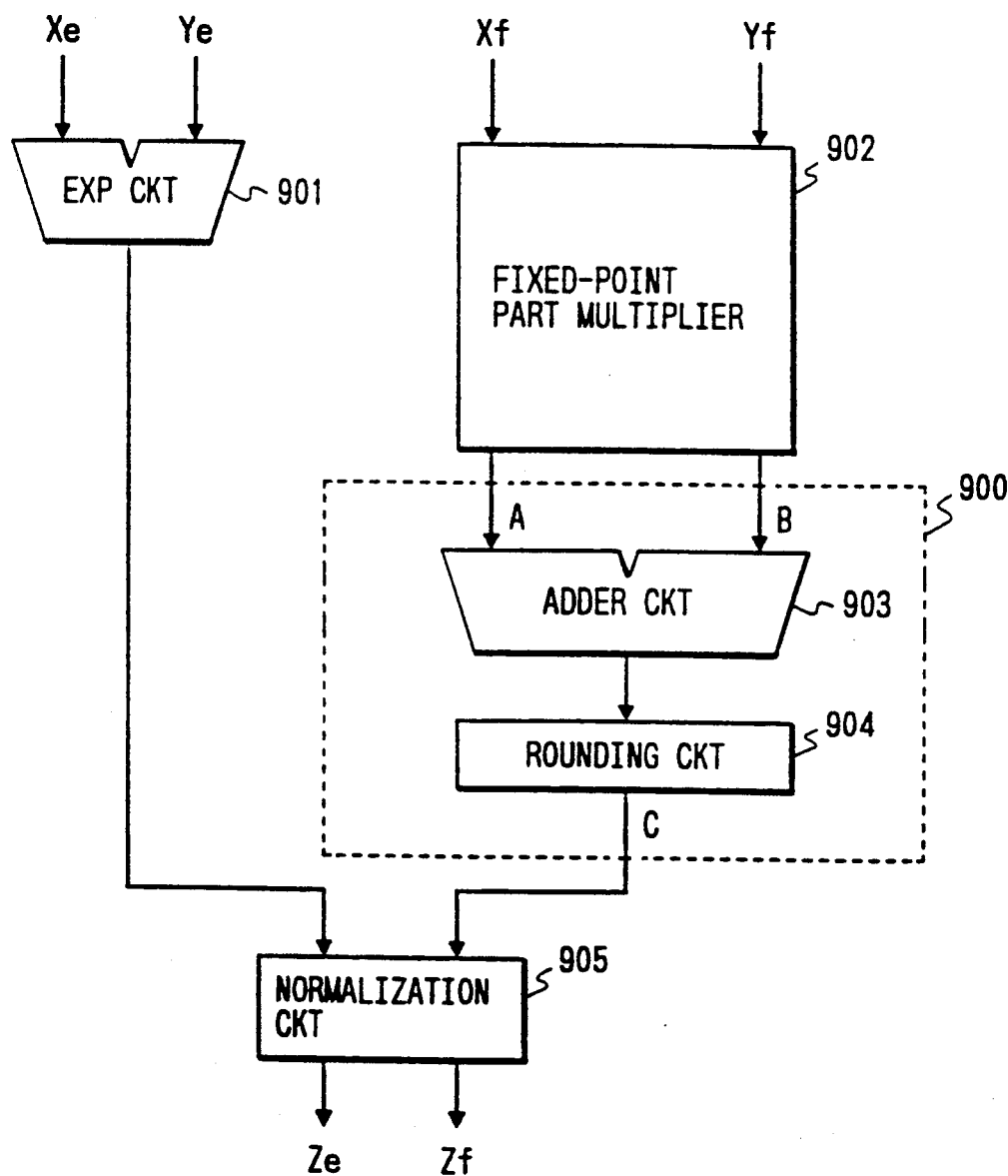
FIG. 9 is a schematic block diagram for illustrating the construction of a conventional floating-point multiplier.

FIG. 4 is a schematic block diagram for illustrating the construction of a second embodiment of the present invention. This circuit is used in a floating-point multiplier to add two partial products A and B finally generated by a fixed-point part data multiplier to each other and then round the result of the addition and outputs the rounded result of the operation performed on the fixed-point part data. Namely, this circuit corresponds to a fixed-point part processing portion 900 of the conventional circuit of FIG. 9. In FIG. 4, reference numeral 401 a rounding-carry generating circuit; 402 a carry save adder; 403 an adder; 404 a result-of-operation-selecting-signal generating circuit; and 405 a selection circuit. Further, reference character Rd designates a rounding mode signal; A and B two partial products finally generated in a fixed-point part multiplier; $a_i$ a value held at each digit of an operand A (i=0, 1, ..., n-1, g, r, s); $b_i$ a value held at each digit of another operand B (i=0, 1, ..., n-1, g, r, s); $u_i$ a value of each digit of a carry (or a borrow) inputted from the carry save adder 402 to the adder 403 (i=0, 1, ..., n); and $v_j$ a value of each digit of a sum (or a difference) inputted from the carry save adder 402 to the adder 043 (j=0, 1, ..., n-1). Furthermore, P designates data indicating U+V); and Q data indicating $\{U+(V+1)\}$. Moreover, $p_i$ indicates an element of the data P (i=0, 1, ..., n); and $q_i$ an element of data Q (i=0, 1, ..., n). Moreover, C represents a result of an operation performed on fixed-point part data. The construction of the circuit of FIG. 4 is similar to that of the circuit of FIG. 1. In addition, the circuit of FIG. 4 deals with only an addition and therefore the fixed-point parts cannot be negative.

Hereinafter, an operation of the circuit of FIG. 4 will be described briefly. First, two carries $C_{r1}$ and $C_{r2}$ for a rounding operation are obtained from low-order digits of the data A and B and the rounding mode signal Rd for indicating the direction in which the rounding operation is performed, by the rounding-carry generating circuit 401. When performing an operation, an overflow may occur. Thus, two kinds of values of a carry, namely, a value of a carry in case of rounding data to a higher order digit and another value of a carry in case of rounding data to a lower order digit are obtained. At that time, the adder to be used is common to both of the cases of rounding data to a higher order digit and of rounding data to a lower order digit. As the result, the rounding carry generated in both of the cases is added to the same digit of data in the adder 403. Further, a sum of the carries $C_{r1}$ and $C_{r2}$ becomes a carry for a rounding into the least significant bit of the data of the adder 403. Between these carries, the carry $C_{r1}$ is inputted to the adder 403. Simultaneously with this, an addition of high-order n digits of the input data A and B is effected and then a carry c and a sum s are calculated by the carry save adder 402. The obtained carry and sum c and S are inputted to the adder 403. Subsequently, an addition of the data thus inputted to the adder 403 is performed therein to calculate $P=U+V$ and $Q=U+(V+1)$. Then, the calculated data P and Q are inputted to the selection circuit 405. Next, a result-of-operation selecting signal is produced from the carry $C_{r2}$ outputted from the rounding carry generating circuit 401 and the high-order digits of the data P and Q outputted from the adder 403 by the result-of-operation-selecting-signal generating circuit 404. The produced result-of-operation selecting signal is inputted to the selection circuit 405. Then, the selection circuit 405 selects one of the data (U+V) and $\{U+(V+1)\}$ and outputs the selected data as the result C of the operation performed on fixed-point part data.

Hereinafter, an operation of each circuit of FIG. 4 will be explained in detail.

In FIG. 4, reference numeral 401 designates the rounding-carry generating circuit which calculates the two carries $C_{r1}$ and $C_{r2}$ for a rounding operation from low-order digits of the data A and B and the rounding mode signal Rd for indicating the direction in which the rounding operation is performed. This circuit has a function similar to the adding function of the rounding-carry generating circuit 101 of FIG. 1 and has many combinations of low-order data inputted thereto.

First, data to be inputted to this circuit will be described hereinbelow. Namely, the data to be inputted to this circuit are two partial products A and B finally generated in the fixed-point part multiplier. There are two digits to which the result of an operation is rounded depending on the result of the operation when effecting the rounding. This is because there are two digits, which may be employed as the most significant digit having a value of 1, correspondingly to the combinations of data inputted thereto. For example, a product Z or data X and Y, which meet the following condition: $1 \leq X, Y < 2$, satisfies the following condition: $1 \leq Z < 4$. In case of employing a binary notation, there are two possible cases of Z. The most significant digit of one of the cases of Z has a weight of 2. Further, the most significant digit of the other case of Z has a weight of 1. Therefore, similarly as in case of performing an addition or subtraction, two cases (namely, a case where the result of the operation is rounded to a higher order digit and another case where the result of the operation is rounded to a lower order digit) should be taken into consideration. In the following description, it is assumed that the alignment is effected such that the digit $a_o$ or $b_o$ becomes LSB in case of rounding the result of the operation to a higher order digit, and the digit $a_g$ or $b_g$ becomes LSB in case of rounding data to a lower order digit. In this case, among digits which are forced out to the right by the shift and other than highest-order n digits, the highest order digits are represented as guard digits $a_g$ and $b_g$; the next higher order digits as round digits $a_r$ and $b_r$; and each piece of information on all of the remaining digits is represented as sticky digits $a_s$ and $b_s$. Thus, information on the guard digits, the round digits and the sticky digits is stored for precisely performing a rounding operation.

FIG. 5 is a truth table for illustrating how the rounding carries $C_{r1}$ and $C_{r2}$ are generated correspondingly to values of the low-order digits (namely, values of the guard digit, the round digit and the sticky digit) and to rounding modes in case where the result of a multiplication becomes positive. In this figure, each value of the leftmost column g represents a value (namely, a sum) obtained by adding the values held at the guard digits $a_g$ and $b_g$ after the alignment is effected. As is seen from this figure, a set of three values {0, 1 and 2} appears in the column g. In case where both of the guard digits $a_g$ and $b_g$ have a value of 0, the sum is 0. Further, in case where only one of the guard digits $a_g$ and $b_g$ has a value of 0, and the sum is 1. Moreover, in case where both of the guard digits $a_g$ and $b_g$ have a value of 1, the sum is 2. Similarly as in case of the column g, each value of a column r is obtained from values held at the round digits $a_r$ and $b_r$. However, differently from the case of effecting the addition as described above by referring to FIG. 2, the value held at the digit $a_r$ is not necessarily 0. Thus, values of 0, 1 and 2 appear in the column r. In addition, information of a column s is used for the rounding of fixed-point part data to a lower order digit and includes both of information on a carry from the sticky digit due to the result of the addition of data held at digits, of which the orders are equal to or less than the sticky digit, and information indicating whether or not all of the data held at the digits, of which the orders are equal to or less than the sticky digit, after the addition is effected are 0. Therefore, there are four possible values of the sticky digit corresponding to a column s. This can be easily understood by considering combinations of the data held at the digits, of which the orders are equal to or less than the sticky digit. Let {0, 1, 2 and 3} be a set of the possible four values. Here, a subset of the values {0, 1} corresponds to a case where no carry is generated; another subset of the values {2, 3} corresponds to another case where a carry is generated; further, another subset of the values {0, 2} corresponds to another case where all of the data held at the digits, of which the order are equal to or less than the sticky digit, are 0; and still another subset of the values {1, 3} corresponds to still another case where at least one of the digits, of which the orders are equal to or less than the sticky digit, has non-zero values. Further, each value of the column s is obtained by computing a carry from the sticky digit and a logical sum of data held at digits, the orders of which are equal to or less than that of the sticky digit, by actually adding the data held at digits, the orders of which are equal to or less than that of the sticky digit. Thus, operations of determining values of the column s are time-consuming. Further, the columns RTP, RTM, RTZ and RTN and the carries $C_H$, $C_L$, $C_H^e$ and $C_H^o$ and the result $S_g$ are similar to those of FIG. 2.

As can be understood from FIG. 5, each of the rounding carries $C_H$ and $C_L$ has a value of 0, 1 or 2, similarly as in case of effecting the addition in the first embodiment of the present invention. Thus, in this case, the addition of the two partial products and the rounding of the result of the addition can be achieved by using the similar configuration of the circuit. Moreover, in this case, the carry-saving addition and the time-consuming generation of the sticky digit can be performed in parallel with one another by determining a logic to generate the carry $C_{r1}$ in such a manner not to depend on the value of the column s (namely, that of the sticky digit). In case of the example of this truth table, the generation of the carry $C_{r1}$ depends on only the values held at the guard digit and the rounding digit (namely, the values of the columns g and r). Incidentally, the method of generating the carries $C_{r1}$ and $C_{r2}$ as described above by referring to FIG. 5 is mere and example. The same effects can be obtained by similarly employing another combination of the carries.

As described above, the rounding-carry generating circuit 401 performs the function of calculating the carries $C_{r1}$ and $C_{r2}$ according to the rounding modes and the input data.

Next, the carry save adder 402 will be described hereinbelow. This circuit is used to calculate a carry and a sum correspondingly to each digit in order to enable an addition of the carry $C_{r1}$ for a rounding to the least significant digit of each of the two pieces of the input data. Further, this circuit is composed of half adder-subtracters. The function of this circuit is equivalent to that obtained by reducing the function of performing a subtraction from those of the carry save adder-subtracter 102 of FIG. 1 as described in the explanation of the first embodiment.

Next, the adder 403 will be described hereinbelow. This circuit is used to calculate the equations $P = U + V$ and $Q = U + (V + 1)$ from carry data U, which is formed by using the carry $C_{r1}$ generated by the rounding-carry generating circuit 401 and the carries $c_j$ obtained by the carry save adder 402, and sum data V which is formed by using the sums $S_j$ obtained by the carry save adder 402. In this case, the function of this circuit is equivalent to that obtained by reducing the function of performing a subtraction from those of the adder-subtracter 103 of FIG. 1 as described in the explanation of the first embodiment.

Next, the result-of-operation-selecting-signal generating circuit 404 will be described hereinbelow. This circuit is used to generate a signal for selecting a suitable result from P and Q obtained by the adder 403 on the basis of the carry $C_{r2}$ obtained by the rounding-carry generating circuit 401 and the high-order digits (namely, $p_n$, $p_{n-1}$ and $q_{n-1}$) of P and Q. Incidentally, in this case, it is assured that the result of the multiplication outputted from the multiplier is positive. This is because the multiplication is effected between positive fixed-point parts. Therefore, in this case, the function of this circuit is equivalent to that obtained by reducing the function of generating a selecting signal when the result becomes negative from those of the result-of-operation-selecting-signal generating circuit 104 of FIG. 1 as described in the explanation of the first embodiment.

After the result of the multiplication performed on the fixed-point data is obtained in the above described manner, the obtained result is inputted to the normalization circuit whereupon the alignment of the fixed-point part data and the correction of the exponent part data are performed. Thus, the floating-point operation is completed.

By constructing a fixed-part data processing circuit as above described, the addition of the partial products can be started before the sum of the data held at the digits, the orders of which are equal to or less than that of the sticky digit, and the digit, to which the result of the multiplication is rounded, are determined. Consequently, a multiplication of fixed-point part data and a rounding operation of the result of the multiplication can be performed at a high speed.

Figure 6:
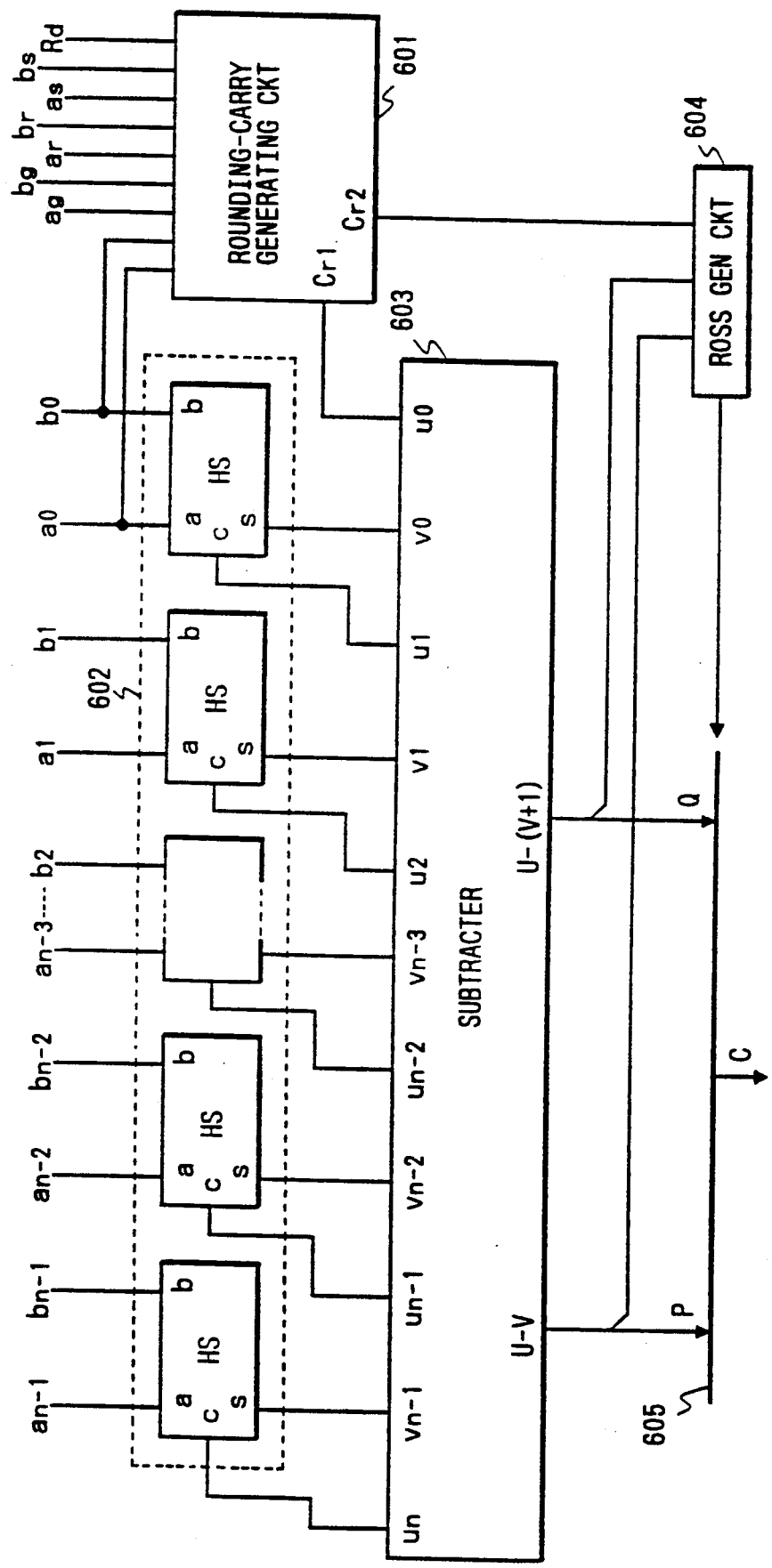
FIG. 6 is a schematic block diagram for illustrating the construction of a circuit for converting the result of a multiplication into a binary number and rounding the result of the multiplication in case where a redundant binary number multiplier is employed for floating-point multiplier, namely, a third embodiment of the present invention.

FIG. 6 is a schematic block diagram for illustrating the construction of a third embodiment of the present invention. This circuit is used to convert the result of a multiplication into an ordinary binary number and round the result of the multiplication in case where a redundant binary number multiplier is employed for performing an internal operation on fixed-point part data in a floating-point multiplier and output the result of the internal operation on the fixed-point part data. Thus, this circuit (hereunder sometimes referred to as a fixed-point part processing device) corresponds to the fixed-point part processing portion 900 of the conventional circuit of FIG. 9. Although two positive partial products finally obtained are inputted to a fixed-point part processing device using ordinary binary numbers, the result represented by using a redundant binary number is inputted to the fixed-point part processing device of the third embodiment of the present invention. Each digit of the redundant binary number has a value of 1, 0 or $-1$. Therefore, the conversion of the redundant binary number into an ordinary binary number can be achieved by subtracting binary data B, in which only values of digits thereof corresponding to the digits of the redundant number having a value of $-1$ are 1, from binary data A, in which only values of digits thereof corresponding to the digits of the redundant number having a value of 1 are 1. These two pieces A and B of binary data are inputted to the fixed-point part processing device.

In FIG. 6, reference numeral 601 a rounding-carry generating circuit; 602 a carry save subtracter; 603 a subtracter; 604 a result-of-operation-selecting-signal generating circuit; and 605 a selection circuit. Further, reference character Rd designates a rounding mode signal; A and B two partial products finally generated in a redundant binary number multiplier; $a_i$ a value held at each digit of A ($i=0, 1, \ldots, n-1, g, r, s$); $b_i$ a value held at each digit of B ($i=0, 1, \ldots, n-1, g, r, s$); $u_i$ a value of each digit of a carry inputted from the carry save subtracter 602 to the subtracter 603 ($i=0, 1, \ldots, n$); and $v_j$ a value of each digit of a sum (or a difference) inputted from the carry save adder 602 to the subtracter 603 ($j=0, 1, \ldots, n-1$). Furthermore, P designates data indicating $(U-V)$; and Q data indicating $\{U-(V+1)\}$. Moreover, $p_i$ indicates an element of the data P ($i=0, 1, \ldots, n$); and $q_i$ an element of data Q ($i=0, 1, \ldots, n$). Moreover, C represents a result of an operation performed on fixed-point part data. The construction of the circuit of FIG. 6 is similar to that of the circuit of FIG. 4. In addition, the circuit of FIG. 6 deals with only a subtraction and the fixed-point parts cannot be negative.

Hereinafter, an operation of the circuit of FIG. 6 will be described briefly. First, two carries $C_{r1}$ and $C_{r2}$ for a rounding operation are obtained from low-order digits of the data A and B and the rounding mode signal Rd for indicating the direction in which the rounding operation is performed, by the rounding-carry generating circuit 601. Thus, in this case, two kinds of values of a carry, namely, a value of a carry in case of rounding data to a higher order digit and another value of a carry in case of rounding data to a lower order digit are calculated. At that time, the subtracter to be used is common to both of the cases of rounding data to a higher order digit and of rounding data to a lower order digit. As the result, the rounding carry generated in both of the cases is added to the same digit of data in the subtracter 603. Further, a sum of the carries $C_{r1}$ and $C_{r2}$ becomes a carry for a rounding into the least significant digit of the data of the subtracter 603. Between these carries, the carry $C_{r1}$ is inputted to the subtracter 603. Simultaneously with this, a subtraction between high-order n digits of the input data A and B is effected and then a carry c and a sum s are calculated by the carry save subtracter 602. The obtained carry and sum c and s are inputted to the subtracter 603. Subsequently, a subtraction between the data thus inputted to the subtracter 603 is performed therein to calculate $P=U-V$ and $Q=U-(V+1)$. Then, the calculated data P and Q are inputted to the selection circuit 605. Next, a result-of-operation selecting signal is produced from the carry $C_{r2}$ outputted from the rounding carry generating circuit 601 and the high-order digits of the data P and Q outputted from the subtracter 603 by the result-of-operation-selecting-signal generating circuit 604. The produced result-of-operation selecting signal is inputted to the selection circuit 605. Then, the selection circuit 605 selects one of the data $(U-V)$ and $\{U-(V+1)\}$ and outputs the selected data as the result C of the operation performed on fixed-point part data.

Hereinafter, an operation of each circuit of FIG. 6 will be explained in detail.

In FIG. 6, reference numeral 601 designates the rounding-carry generating circuit which calculates the two carries $C_{r1}$ and $C_{r2}$ for a rounding operation from low-order digits of the data A and B and the rounding mode signal Rd for indicating the direction, in which the rounding operation is performed. This circuit has a function similar to the subtracting function of the rounding-carry generating circuit 101 of FIG. 1 and has many combinations of low-order data inputted thereto.

First, data to be inputted to this circuit will be described hereinbelow. Namely, the data to be inputted to this circuit are the data A and B indicating positive and negative digits of the redundant binary numbers finally generated in the fixed-point part multiplier. Similarly as in case of the second embodiment, there are two digits to which the result of an operation is rounded depending on the result of the operation when effecting the rounding, in this case. It is assumed that the alignment is effected such that the digit $a_o$ or $b_o$ becomes LSB in case of rounding the result of the operation to a higher order digit, and the digit $a_g$ or $b_g$ becomes LSB in case of rounding data to a lower order digit. In this case, among digits which are forced out to the right by the shift and other than highest-order n digits, the highest order digits are represented as guard digits $a_g$ and $b_g$; the next higher order digits as round digits $a_r$ and $b_r$; and each piece of information on all of the remaining digits is represented as sticky digits $a_s$ and $b_s$. Thus, information on the guard digits, the round digits and the sticky digits is stored for precisely performing a rounding operation.

FIG. 7 is a truth table for illustrating how the rounding carries $C_{r1}$ and $C_{r2}$ are generated correspondingly to values of the low-order digits (namely, values of the guard digit, the round digit and the sticky digit) and to rounding modes in case where the result of a multiplication is positive. In this figure, each value of the leftmost column g represents a value (namely, a difference) obtained by performing a subtraction between the values held at the guard digits $a_g$ and $b_g$ after the alignment is effected. As is seen from this figure, a set of three values ($\{1, 0, -1\}$) appears in the column g. Similarly as in case of the column r, each value of a column r is obtained from values held at the round digits $a_r$ and $b_r$. Additionally, information of a column s is used for the rounding of fixed-point part data to a lower order digit and includes both of information on a carry from the sticky digit due to the result of the subtraction between data held at digits, of which the orders are equal to or less than the sticky digit, and information indicating whether or not all of the data held at the digits, of which the orders are equal to or less than the sticky digit, after the subtraction is effected are 0. Therefore, there are three possible values (namely, 1, 0 and $-1$) of the stick digit corresponding to a column s. This can be easily understood by considering combinations of the data held at the digits, of which the orders are equal to or less than the sticky digit. Let $\{0, 1, 0$ and $-1\}$ be a set of the possible three values. Here, a subset of the values ($\{0, 1\}$) corresponds to a case where no carry is generated; another subset of the values $\{-1\}$ corresponds to another case where a carry is generated; further another subset of the values $\{0\}$ corresponds to another case where all of the data held at the digits, of which the orders are equal to or less than the sticky digit, are 0; and still another subset of the values $\{1, -1\}$ corresponds to still another case where at least one of the digits, of which the orders are equal to or less than the sticky digit, has non-zero values. Further, each value of the column s is obtained by computing a carry from the sticky digit and a logical sum of data held at digits, the orders of which are equal to or less than that of the sticky digit, by actually performing a subtraction between the data held at digits, the orders of which are equal to or less than that of the sticky digit. Thus, operations of determining values of the column s are time-consuming. Further, the columns RTP, RTM, RTZ and RTN and the carries $C_H$, $C_L$, $C_H^e$ and $C_H^o$ and the result $S_g$ are similar to those of FIG. 2.

As can be understood from FIG. 7, each of the rounding carries $C_H$ and $C_L$ has a value of 1, 0 or $-1$. Thus, in order to realize positive and negative carries, the carry is generated by performing the following two steps similarly as in cases of the above described embodiments of the present invention. Namely, a one-stage carry-saving subtraction is first performed, and thereafter another subtraction is effected by employing a carry look ahead method or the like. The final subtraction is performed by a subtracter to obtain a binary result. Therefore, there can be generated only a negative carry. Thus, the carry $C_{r1}$ is added to the result of the carry-saving subtraction. Subsequently, the result of a carry-look-ahead addition is selected by using the negative carry $C_{r2}$. At that time, the carry $C_{r1}$ generated in case of rounding the result to a higher order digit is made to be in agreement with that generated in case of rounding the result to a lower order digit, similarly as in cases of the above described embodiments of the present invention. Namely, the carries $C_{r1}$ and $C_{r2}$ are obtained such that the equations (1) and (2) are satisfied. This results in that the identical carry save subtracter and carry look ahead subtracter can be used in common to both of the cases of rounding the result to a higher order digit and of rounding the result to a lower order digit. The carry-saving subtraction, the carry-look-ahead subtraction and the time-consuming generation of the sticky digit can be performed in parallel with one another by determining a logic to generate the positive carry $C_{r1}$ in such a manner not to depend on the value of the column s (namely, that of the sticky digit). Incidentally, the method of generating the carries $C_{r1}$ and $C_{r2}$ as described above by referring to FIG. 7 is mere an example. The same effects can be obtained by similarly employing another combination of the carries.

As described above, the rounding-carry generating circuit 601 has the function of calculating the carries $C_{r1}$ and $C_{r2}$ according to the rounding modes and the input data.

Next the carry save subtracter 602 will be described hereinbelow. This circuit is used to calculate a carry and a sum correspondingly to each digit in order to enable an addition of the carry $C_{r1}$ for a rounding to the least significant digit of the input data. Further, this circuit is composed of half subtracters. The function of this circuit is equivalent to that obtained by reducing the function of performing an addition from those of the carry save adder-subtracter 102 of FIG. 1 as described in the explanation of the first embodiment. However, the carry $C_{r1}$ should be positive as described above. Thus, as is indicated by the equation (4), half subtracters should be provided in the circuit.

Next, the subtracter 603 will be described hereinbelow. This circuit is used to calculate the equations $P = U - V$ and $Q = U - (V + 1)$ from carry data U, which is formed by using the carry $C_{r1}$ generated by the rounding-carry generating circuit 601 and the carries $c_i$ obtained by the carry save subtracter 602, and sum data V which is formed by using the sums $S_i$ obtained by the carry save subtracter 602. In this case, the function of this circuit is equivalent to that obtained by reducing the function of performing an addition from those of the adder-subtracter 103 of FIG. 1 as described in the explanation of the first embodiment.

Next, the result-of-operation-selecting-signal generating circuit 604 will be described hereinbelow. This circuit is used to generate a signal for selecting a suitable result from P and Q obtained by the subtracter 603 on the basis of the carry $C_{r2}$ obtained by the rounding-carry generating circuit 601 and the high-order digits (namely, $p_n$, $p_{n-1}$ and $q_{n-1}$) of P and Q. Incidentally, in this case, it is assured that the result of the multiplication outputted from the redundant binary number multiplier is positive. This is because the multiplication is effected between positive fixed-point parts. Thus, the sign of the result of the multiplication is never changed by subtracting B from A, and only the positive result should be taken into consideration. Therefore, in this case, the function of this circuit is equivalent to that obtained by reducing the function of generating a selecting signal when the result becomes negative from those of the result-of-operation-selecting-signal generating circuit 104 of FIG. 1 as described in the explanation of the first embodiment of the present invention.

After the result of the multiplication performed on the fixed-point data is obtained in the above described way, the obtained result is inputted to the normalization circuit whereupon the alignment of the fixed-point part data and the correction of the exponent part data are performed. Thus, the floating-point operation is completed.

By constructing a fixed-part data processing device as above described, the conversion of the redundant binary number can be started before the sum of the data held at the digits, the orders of which are equal to or less than that of the sticky digit, and the digit, to which the result of the multiplication is rounded, are determined. Consequently, a multiplication between fixed-point part data and a rounding operation of the result of the multiplication can be performed as a high speed.

While preferred embodiments of the present invention have been described above, it is to be understood that the present invention is not limited thereto and that other modifications will be apparent to those skilled in the art without departing from the spirit of the invention. For example, in the foregoing descriptions of the preferred embodiments of the present invention the cases of performing an addition, a subtraction and a multiplication on floating-point data have been described. However, in accordance with the present invention, in cases of effecting other operations such as a division, calculation of a square root, format conversions of floating-point data and of integers, a final operation and a rounding of the result thereof can be performed at a high speed.

The scope of the present invention, therefore, is to be determined solely by the appended claims.

What is claimed is:

1. A floating-point processor for performing addition and subtraction of two floating-point numbers, said floating-point processor comprising:
   a carry saving adder-subtracter for generating carry data and sum data by performing addition and subtraction of a first fixed-point part of the floating-point number having a greater exponent part and a second fixed-point part, which is aligned with the first fixed-point part by being shifted right, of the other floating-point number having a smaller exponent part according to following equations:
   (i) in case where an addition is performed, $a_i + b_i = 2c_i + s_i;$ (ii) in case where a subtraction is performed and the carry data is positive, $a_i + b_i = 2c_i - s_i;$ (iii) in case where a subtraction is performed and the carry data is negative, $a_i - b_i = -2c_i + s_i;$ where i is an integer greater than zero; $a_i$ denotes a value held at an ith digit of the first fixed-point part; $b_i$ denotes a value held at an ith digit of the second fixed-point part; $c_i$ denotes a value held at an ith digit of the carry data; and $s_i$ denotes a value held at an ith digit of the sum data;
   a rounding-carry generating circuit for generating a first rounding-carry, of which the value in case of rounding a result of addition or subtraction between the first and second fixed-point parts to a higher order digit is in agreement with the value in case of rounding the result of addition or subtraction between the first and second fixed-point parts to a lower order digit, from a rounding-mode signal indicating the direction in which a result of addition or subtraction between the first and second fixed-point parts is rounded, and low-order digits of the first and second fixed-point parts and for generating a second rounding-carry in each of the cases of rounding the result of addition or subtraction between the first and second fixed-point parts to a higher order digit and or rounding the result of addition or subtraction between the first and second fixed-point parts to a lower order digit;
   an adder-subtracter for outputting a first result of addition or subtraction between data, which is obtained by adding the first rounding-carry to the least significant digit of the carry data, and the sum data and for outputting a second result of adding 1 to or subtracting 1 from the first result;
   an inversion circuit for outputting a logical inversion of all digits of the second result; and
   a selection circuit for selecting and outputting one of the first result, the second result and an output of the inversion circuit on the basis of high-order digits of the first and second results and the second rounding-carry.

2. The floating-point processor as set forth in claim 1, wherein the rounding-carry generating circuit generates the first rounding-carry in such a manner not to depend on the value held at a sticky digit and the second rounding-carry in such a manner to depend on the value held at the sticky digit.

3. The floating-point processor as set forth in claim 1, wherein the alignment of the first and second fixed-point part data is effected in case of performing an addition such that the least significant digit position of the first fixed-point part becomes a guard digit position, and wherein the alignment of the first and second fixed-point part data is effected in case of performing a subtraction such that the least significant digit position of the first fixed-point part becomes higher than the guard digit position by one digit.

4. A floating-point processor for performing an arithmetic operation on two floating-point numbers, said floating-point processor comprising:
   a carry save adder for generating carry data and sum data by performing a carry-saving addition of n highest-digits (n is the number of significant digits of fixed-point parts of the floating point numbers) of two pieces of data;
   a rounding-carry generating circuit for generating a first rounding-carry, of which the value in case of rounding a result of the arithmetic operation between the fixed-point parts to a higher order digit is in agreement with the value in case of rounding the result of the operation between the fixed-point parts to a lower order digit, from a rounding-mode signal indicating the direction in which a result of an operation between the fixed-point parts is rounded, and low-order digits of each of the two pieces of data other than (n−1) highest-order digits thereof and for generating a second rounding-carry in each of the cases of rounding the result of the operation between the fixed-point parts to a higher order digit and of rounding the result of the operation between the fixed-point parts to a lower order digit;

an adder for outputting a first result of an addition between data, which is obtained by adding the first rounding-carry to the least significant digit of the carry data, and the sum data and for outputting a second result of adding 1 to the first result; and a selection circuit for selecting and outputting one of the first and second results on the basis of high-order digits of the first and second results and the second rounding-carry.

5. The floating-point processor as set forth in claim 4, wherein the rounding-carry generating circuit generates the first rounding-carry in such a manner not to depend on the value held at a sticky digit and the second rounding-carry in such a manner to depend on the value held at the sticky digit.

6. A floating-point processor for performing an arithmetic operation on two floating-point numbers, said floating-point processor comprising:

a carry save subtracter for generating carry data and sum data by performing a carry-saving subtraction between n highest-digits (n is the number of significant digits of fixed-point parts of the floating point numbers) and two pieces of data;

a rounding-carry generating circuit for generating a first rounding-carry, of which the value in case of rounding a result of the arithmetic operation between the fixed-point parts to a higher order digit is in agreement with the value in case of rounding the result of the arithmetic operation between the fixed-point parts to a lower order digit, from a rounding-mode signal indicating the direction in which a result of an operation between the fixed-point parts is rounded, and low-order digits of each of the two pieces of data other than (n−1) highest-order digits thereof and for generating a second rounding-carry in each of the cases of rounding the result of the operation between the fixed-point parts to a higher order digit and of rounding the result of the operation between the fixed-point parts to a lower order digit;

a subtracter for outputting a first result of a subtraction between data, which is obtained by adding the first rounding-carry to the least significant digit of the carry data, and the sum data and for outputting a second result of subtracting 1 from the first result; and a selection circuit for selecting and outputting one of the first and second results on the basis of high-order digits of the first and second results and the second rounding-carry.

7. The floating-point processor as set forth in claim 6, wherein the rounding-carry generating circuit generates the first rounding-carry in such a manner not to depend on the value held at a sticky digit and the second rounding-carry in such a manner to depend on the value held at the sticky digit.

8. A floating-point processor having a fixed-point part multiplier for performing a multiplication of two floating-point numbers by calculating partial products, said floating-point processor comprising:

a carry save adder for generating carry data and sum data by performing a carry-saving addition of n highest-digits (n is the number of significant digits of fixed-point parts of the floating point numbers) of two partial products finally obtained by the fixed-point part multiplier according to a following equation:

$$a_i + b_i = 2c_i + s_i$$

where $a_i$ denotes a value held at an ith digit of a first fixed-point part; $b_i$ a value held at an ith digit of a second fixed-point part; $c_i$ a value held at an ith digit of the carry data; and $s_i$ a value held at an ith digit of the sum data;

a rounding-carry generating circuit for generating a first rounding-carry, of which the value in case of rounding a result of the multiplication between the first and second fixed-point parts to a higher order digit is in agreement with the value in case of rounding the result of the multiplication between the first and second fixed-point parts to a lower order digit, from a rounding-mode signal indicating the direction in which a result of a multiplication between the first and second fixed-point parts is rounded, and low-order digits of each of the two partial products other than (n−1) highest-order digits thereof and for generating a second rounding-carry in each of the cases of rounding the result of the multiplication between the first and second fixed-point parts to a higher order digit and of rounding the result of the multiplication between the first and second fixed-point parts to a lower order digit;

an adder for outputting a first result of an addition between data, which is obtained by adding the first rounding-carry to the least significant digit of the carry data, and the sum data and for inputting as second result of adding 1 to the first result; and a selection circuit for selecting and outputting ones of the first and second results on the basis of high-order digits of the first and second results and the second rounding-carry.

9. The floating-point processor as set forth in claim 8, wherein the rounding-carry generating circuit generates the first rounding-carry in such a manner not to depend on the value held at a sticky digit and the second rounding-carry in such a manner to depend on the value held at the sticky digit.

10. A floating-point processor havinga redundant binary fixed-point part multiplier for performing a multiplication of two floating-point numbers, said floating-point processor comprising:

a carry save subtracter for generating carry data and sum data by performing a subtraction between n-highest-digits (n is the number of significant digits of fixed-point parts of the floating point numbers) of first and second fixed-point parts of partial product data finally obtained by the redundant binary fixed-point part multiplier according to following equations:

(i) in case where the carry data is positive, $$a_i + b_i = 2c_i - s_i,$$

(ii) in case where the carry data is negative, $$a_i - b_i = -2c_i + s_i,$$

where $a_i$ denotes a value held at an ith digit of the first fixed-point part; $b_i$ a value held at an ith digit of the second fixed-point part; $c_i$ a value held at an ith digit of the carry data; and $s_i$ a value held at an ith digit of the sum data;

a rounding-carry generating circuit for generating a first rounding-carry, of which the value in case of rounding a redundant binary result of the multiplication between the first and second fixed-point parts to a higher order digit is in agreement with the value in case of rounding the redundant binary result of the multiplication to a lower order digit, from a rounding-mode signal indicating the direction in which a result of a multiplication between the first and second fixed-point parts is rounded, and low-order digits of the redundant binary result other than $(n-1)$ highest-order digits thereof and for generating a second rounding-carry in each of the cases of rounding the redundant binary result of the multiplication to a higher order digit and or rounding the redundant binary result of the multiplication to a lower order digit;

a subtracter for outputting a first result of a subtraction between data, which is obtained by adding the first rounding-carry to the least significant digit of the carry data, and the sum data and for outputting a second result of subtracting 1 from the first result; and a selection circuit for selecting and outputting one of the first and second results on the basis of high-order digits of the first and second results and the second rounding-carry.

11. The floating-point processor as set forth in claim 10, wherein the rounding-carry generating circuit generates the first rounding-carry in such a manner not to depend on the value held at a sticky digit and the second rounding-carry in such a manner to depend on the value held at the sticky digit.

* * * * *

UNITED STATES PATENT AND TRADEMARK OFFICE
CERTIFICATE OF CORRECTION

PATENT NO. : 5,222,037
DATED : June 22, 1993
INVENTOR(S) : Takashi TANIGUCHI

It is certified that error appears in the above-indentified patent and that said Letters Patent is hereby corrected as shown below:

On the title page, item [75] should read as follows:

--[75] Inventor: Takashi Taniguchi, Osaka, Japan--

Signed and Sealed this

Second Day of May, 1995

Attest:

BRUCE LEHMAN

Attesting Officer

Commissioner of Patents and Trademarks